US012336613B2

(12) United States Patent
Dutton et al.

(10) Patent No.: US 12,336,613 B2
(45) Date of Patent: Jun. 24, 2025

(54) GUIDED BEARING MIX PACK

(71) Applicant: L'Oreal, Paris (FR)

(72) Inventors: Simon Dutton, Basking Ridge, NJ (US); Marcel Sanchez, Aulnay sous-Bois (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 18/477,875

(22) Filed: Sep. 29, 2023

(65) Prior Publication Data

US 2025/0107610 A1 Apr. 3, 2025

(51) Int. Cl.

| | |
|---|---|
| ***A45D 34/04*** | (2006.01) |
| ***B01F 35/30*** | (2022.01) |
| ***B01F 101/21*** | (2022.01) |

(52) U.S. Cl.

CPC .............. *A45D 34/04* (2013.01); *B01F 35/30* (2022.01); *A45D 2200/058* (2013.01); *B01F 2035/352* (2022.01); *B01F 2101/21* (2022.01)

(58) Field of Classification Search

CPC . A45D 34/048; A45D 2200/058; B65D 23/04

USPC .............................................................. 401/4

See application file for complete search history.

(56) References Cited

U.S. PATENT DOCUMENTS

| | | | |
|---|---|---|---|
| 2,829,655 A | 4/1958 | Bau et al. | |
| 2,983,946 A | 5/1961 | Edelstone et al. | |
| 4,927,282 A | 5/1990 | Morane et al. | |
| 5,226,744 A * | 7/1993 | Kemmerer .......... | B01F 35/4111 401/122 |
| 2018/0256923 A1 * | 9/2018 | Ungvarsky .............. | A61K 8/18 |
| 2018/0344006 A1 | 12/2018 | Tarling et al. | |

FOREIGN PATENT DOCUMENTS

| | | | |
|---|---|---|---|
| FR | 2968642 A1 * | 6/2012 | ............. A45D 34/04 |
| WO | 97/35499 A1 | 3/1997 | |

OTHER PUBLICATIONS

Machine Translation of Gueret, FR 2968642 (Year: 2012).*

Preliminary Search Report and Written Opinion mailed Jun. 27, 2024, issued in corresponding French Application No. 2312877, filed Nov. 22, 2023, 8 pages.

* cited by examiner

*Primary Examiner* — David P Angwin

*Assistant Examiner* — Bradley S Oliver

(74) *Attorney, Agent, or Firm* — Christensen O'Connor Johnson Kindness PLLC

(57) ABSTRACT

Container devices, kits, and methods for mixing a heterogeneous composition prior to, during, and/or after use of the composition. A container includes an agitator element disposed in a guide inside the container, as well as an applicator for carrying and applying the composition to a surface. The agitator element is movably disposed within the guide, such that during agitation of the container, the agitator element controllably moves along the guide, through the composition, to mix the composition and increase uniformity of the composition for use. The guide prevents contact of the agitator element with the applicator to prevent damage to the applicator or flocking during agitation. The container is suited for use with cosmetic compositions that can be mixed for use.

20 Claims, 33 Drawing Sheets

GUIDED BEARING MIX PACK

SUMMARY

In an aspect, the disclosure provides a container for mixture of a composition, the container comprising: an agitator element movably disposed within a guide of an interior of the container, wherein the guide defines a mix volume and is elongated such that the agitator element is movable through the mix volume; and an applicator disposable within an applicator volume of the interior of the container, wherein the applicator volume is in fluid communication with the mix volume; wherein agitation of the container moves the agitator element through the mix volume.

In embodiments, the guide further comprises a ridge, at a lower portion of the guide, that extends from an interior wall of the container into the mix volume configured to contact the agitator element for securement of the agitator element in place when the container is not agitated.

In embodiments, the applicator is flocked and is susceptible to breakage.

In embodiments, the agitator element is a ball bearing selected from the group consisting of: a stainless steel ball bearing, a 300 series type stainless steel ball bearing, a type 302 stainless steel ball bearing, a type 304 stainless steel ball bearing, a type 316 stainless steel ball bearing, and any combination thereof.

In embodiments, the guide is disposed within an insert of the container, wherein the insert is insertable into a shell of the container, wherein the shell of the container is sealable with a cap of the container by securement of the cap to the shell.

In embodiments, a cross-sectional shape of the container that defines a cross-sectional shape of the interior of the container comprises a curved line, a straight line, a right angle, an acute angle, a semi-circular line, a circular line, a rectangular line, a square line, or any combination thereof.

In embodiments, with agitation of the container, the agitator element does not enter the applicator volume.

In embodiments, with agitation of the container, the applicator, when disposed within the applicator volume, is not contacted by the agitator element.

In embodiments, the container comprises a first agitator element and a second agitator element movably disposed within a first guide and a second guide of the interior of the container, respectively, wherein the first and second guides define first and second mix volumes and are elongated such that the first and second agitator elements are movable through the first and second mix volumes, respectively, wherein the applicator volume is in fluid communication with the first and second mix volumes, and wherein agitation of the container moves the first and second agitator elements through the first and second mix volumes, respectively.

In embodiments, with agitation of the container, the first and second agitator elements do not enter the applicator volume.

In embodiments, with agitation of the container, the applicator, when disposed within the applicator volume, is not contacted by either of the first and second agitator elements.

In embodiments, the first agitator element and the second agitator element is each, individually: spherical, cuboidal, or semi-circular.

In embodiments, the container comprises a groove on an outer portion thereof that extends an interior wall of the container into a composition volume that excludes the mix volume and the applicator volume, wherein the groove increases mixture of the composition with agitation of the container.

In embodiments, the container comprises a first groove and a second groove disposed at opposite outer portions of the container, wherein the first groove and the second groove extend an interior wall of the container into the composition volume and increase mixture of the composition with agitation of the container.

In embodiments, the first groove and the second groove each comprises an arc shape.

In embodiments, the arc shape of the first groove and the second groove further comprises an indentation shape that further extends the interior wall of the container into the composition volume at positions adjacent to the mix volume.

In an aspect, the disclosure provides a container for mixture of a composition, the container comprising: a first agitator element and a second agitator element movably disposed within a first guide and a second guide of an interior of the container, respectively; wherein the first and second guides define first and second mix volumes and are elongated such that the first and second agitator elements are movable through the first and second mix volumes, respectively, wherein an applicator volume of the interior of the container is configured to receive an applicator therein and is in fluid communication with the first and second mix volumes, wherein the first and second mix volumes combined with the applicator volume form a composition volume for the composition; and wherein agitation of the container moves the first and second agitator elements through the first and second mix volumes, respectively.

In embodiments, the first and second guides comprise cylindrical or arcuate shapes, and wherein the first and second agitator elements are spherical.

In embodiments, the container comprises a first groove and a second groove disposed at opposite outer portions of the container, wherein the first groove and the second groove extend an interior wall of the container into the composition volume and increase mixture of the composition with agitation of the container.

In embodiments, the first groove and the second groove each comprises an arc shape, wherein the arc shape optionally further comprises an indentation shape that further extends the interior wall of the container into the composition volume at positions adjacent to the mix volume.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The foregoing aspects and many of the attendant advantages of this invention will become more readily appreciated as the same become better understood by reference to the following detailed description, when taken in conjunction with the accompanying drawings.

DETAILED DESCRIPTION

Compositions, including cosmetic compositions, often settle when left at rest, resulting in separation of the composition and the need for mixing the composition prior to use. Existing mixers can contain mix elements therein, such as springs and the like, which move within containers holding such compositions for mixture of the compositions prior to use. Movement of these mix elements typically occurs at random with agitation of the container, resulting in inefficient mixing that requires extensive effort (e.g., fifteen or more seconds of hand-mixing by agitation) and increased risk of contact between these mix elements and other elements within the container, such as applicators, which can cause breakage of the applicators or other elements. In the case of a consumer product, the time and exertion required on the part of a consumer can lead to frustration with the product or difficulty obtaining a desired result with the product, or improper or overly vigorous mixing that results in breakage of the container or a component thereof. In these and other situations, there is a need for containers for mixture of compositions that facilitate easy mixing of compositions prior to use, in a shorter timeframe compared to previous efforts due to more efficient mixing (e.g., less than ten seconds of hand-mixing by agitation). The present disclosure addresses these and other long-felt and unmet needs in the art.

Figure 1A:
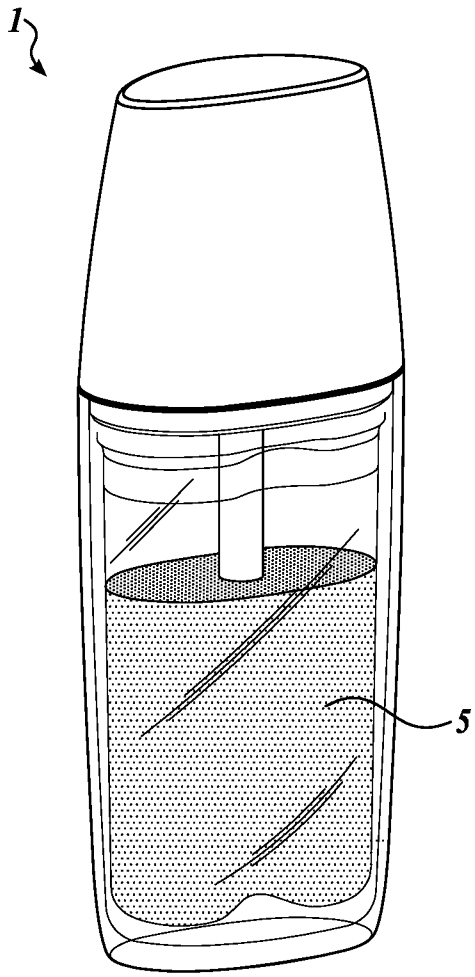
FIG. 1A shows a perspective view of an example container for mixture of a composition, with the composition therein, according to aspects of the disclosure.
Figure 1B:
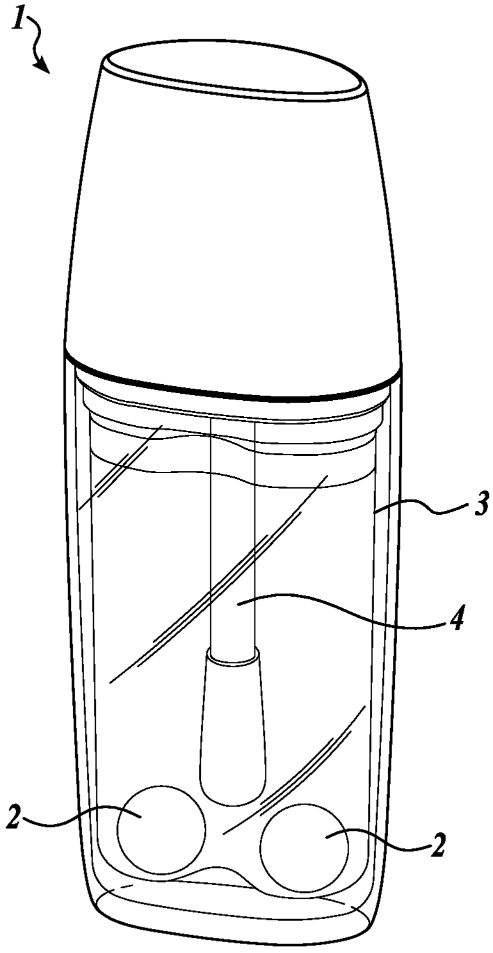
FIG. 1B shows a perspective view of an example container for mixture of a composition, according to aspects of the disclosure.

As shown at FIGS. 1A and 1B, an example container 1 for mixture of a cosmetic composition can be provided empty (e.g., FIG. 1B) or in combination with a cosmetic composition 5 therein (e.g., FIG. 1A), according to embodiments. The cosmetic composition may be comprised of multiple compositional elements that separate when the composition is at rest, including but not limited to immiscible compounds, water/oil mixtures, ionic/non-ionic mixtures, or the like. The un-mixed cosmetic composition can remain unmixed for a period of time without losing its capability for use, however, may benefit from being mixed prior to use for its effectiveness. For this purpose, the disclosure provides various containers and container designs for mixing cosmetic compositions. As shown at FIG. 1B, an example container 1 includes an insert 3 that contains agitator elements 2, as well as applicator 4. The agitator elements 2 move along defined pathways within the container such that they improve mixture of the composition and also do not contact the applicator 4, which would risk damage to applicator 4. In this manner, the container 1 can be utilized for a longer period of time or may have a longer shelf-life compared to other containers or container-composition products.

Figure 2:
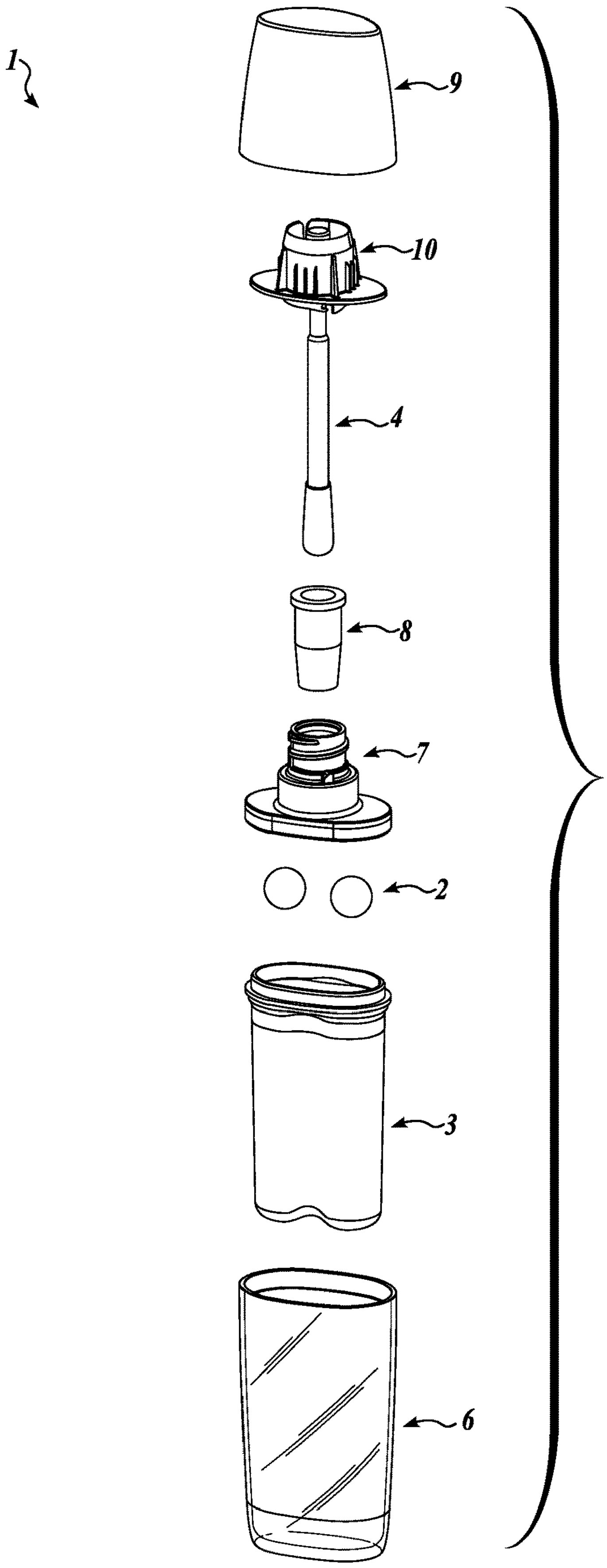
FIG. 2 shows a perspective exploded view of an example container for mixture of a composition, according to aspects of the disclosure.
Figure 3:
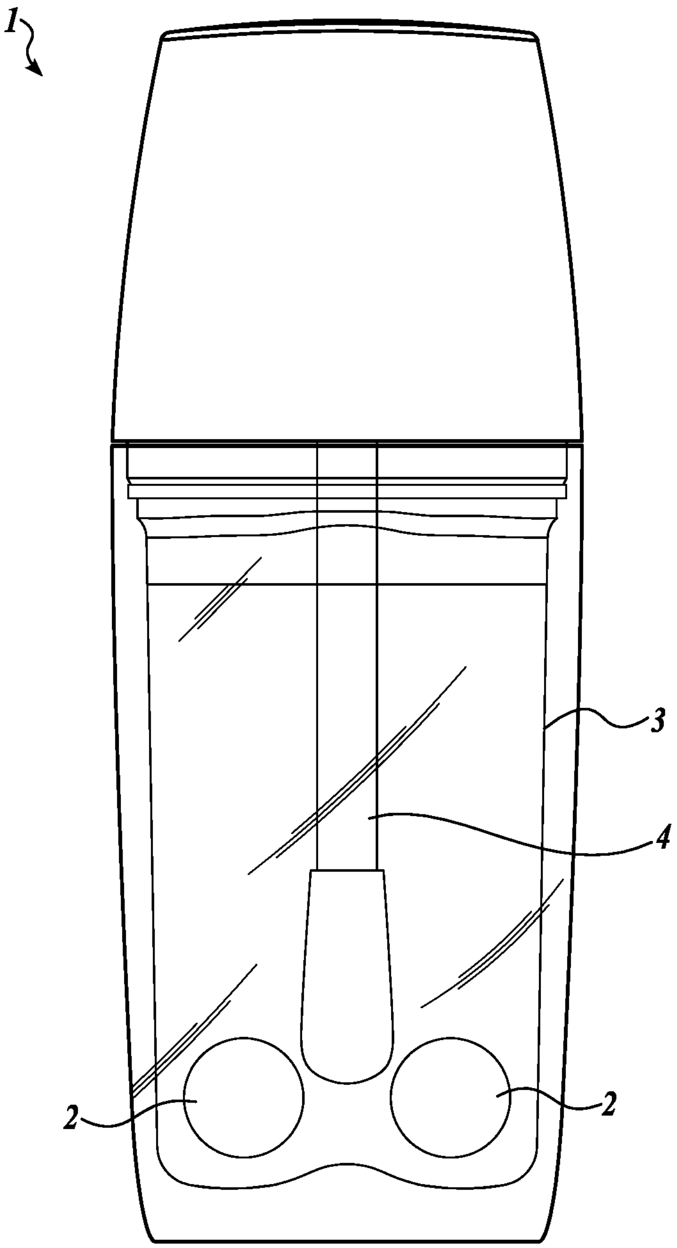
FIG. 3 shows a side view of an example container for mixture of a composition, according to aspects of the disclosure.
Figure 4:
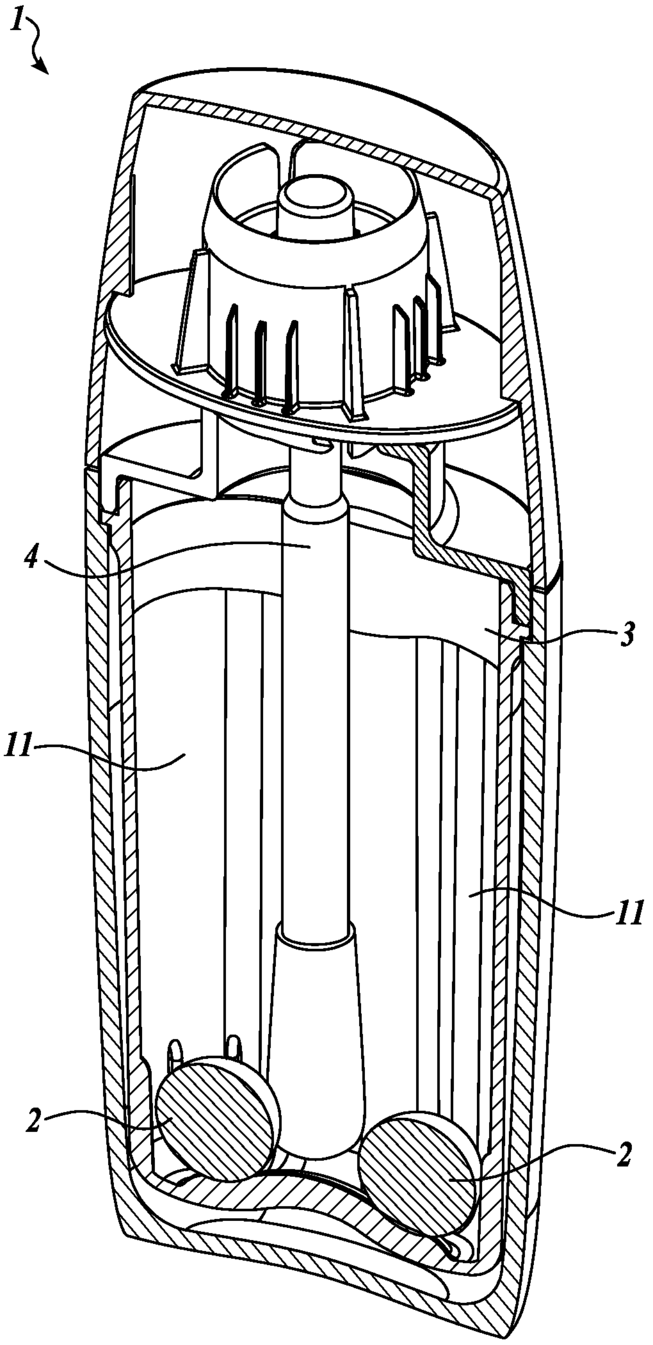
FIG. 4 shows a perspective cross-sectional view of an example container for mixture of a composition, according to aspects of the disclosure.

FIG. 2 shows an example container in an exploded view, and FIG. 3 shows the example container in a side view. Container 1 is configured for mixture of a composition, and comprises an agitator element 2 that is movably disposed within a guide of an interior of the container (e.g., a guide of insert 3 which is insertable into shell 6). The guide defines a mix volume and is elongated such that the agitator element 2 is movable through the mix volume during agitation of the container and mixture of the composition therein. An applicator 4 is disposable within an applicator volume of the interior of the container 1, and the applicator volume is in fluid communication with the mix volume; in this manner, fluid exchange of the composition between the mix volume and the applicator volume means that mixture that occurs in the mix volume provides mixed composition to the applicator volume, which in turn contacts the applicator 4. Agitation of the container 1 moves the agitator element 2 through the mix volume for mixture of the composition to increase its homogeneity prior to, during, or after use. In the shown embodiment, container 1 includes an insert lid 7 which is affixed to the insert 3 for closure thereof, and a wiper 8. Wiper 8 includes an aperture therethrough for passage of the applicator 4 therethrough, when inserting and removing the applicator 4 into and out of the insert 3, respectively. As the applicator 4 passes through the aperture of the wiper 8, surfaces of the aperture of wiper 8 contact surfaces of applicator 4 to remove excess cosmetic composition therefrom. In the shown embodiment, applicator 4 is affixable to a lid adaptor 10, which is configured for a snap fit into the cap 9 for securement of the applicator 4 to the cap 9. During use, an individual can unscrew the cap 9 (which contains threading on interior surfaces thereof) from the insert lid 7, and remove the applicator 4 from the insert 3 by pulling upward on the cap 9. To replace the applicator 4 into the insert 3, e.g., after use, the individual can insert the applicator 4 through the insert lid 7 for entry into the insert 3.

As shown by way of non-limiting examples at FIGS. 4 and 9 and FIGS. 28-33, the example container includes several structural components that operate together for the overall mixing functionality of insert 3 of the container, the sum of which is unexpectedly greater than the contribution of the components individually. In the shown embodiment, a guide 11 further comprises a ridge 14 (or a plurality of ridges 14), at a lower portion of the guide 11, that extends from an interior wall of the container 1 into the mix volume. In embodiments, as shown by way of example at FIG. 33, ridge 14 can extend from middle and upper portions of the interior wall of the container 1 into the mix volume, as needed, for acting as guides for containment and guiding of the agitator elements. Ridge 14 is configured to contact the agitator element 2 for securement of the agitator element 2 in place when the container 1 is not agitated, i.e., when it is at rest; however, in the embodiments of FIG. 33, ridges 14 can contact the agitator elements 2 during agitation. Securement of the agitator element 2 in place within the guide prevents its contact with the applicator 4, thereby preventing damage to or breakage of applicator 4. This is because in at least some embodiments, the applicator 4 is flocked and is susceptible to breakage. In this manner, the applicator 4 is preserved and has a longer useful life.

In embodiments, the agitator element 2 is a ball bearing selected from the group consisting of: a stainless steel ball bearing, a 300 series type stainless steel ball bearing, a type 302 stainless steel ball bearing, a type 304 stainless steel ball bearing, a type 316 stainless steel ball bearing, and any combination thereof. In embodiments, the agitator element 2 is optimized for mixing a cosmetic composition having particular properties or characteristics, including but not limited to viscosity and degree of separation of two or more phases or chemical components of the cosmetic composition.

Example cross-sectional views of containers are shown at FIGS. 4-19, 21, 22A-22F, and 23-32. In embodiments, the guide 11, which can be formed by a shape or curvature of the insert 3, is disposed within the insert 3 of the container 1, and the insert 3 is insertable into the shell 6 of the container. The shell 6 of the container 1 is sealable with a cap 9 of the container 1 by securement of the cap 9 to the shell 6, either directly or indirectly. In embodiments, the guide 11 results from the shape of the insert 3, which can include one or more, two or more, three or more, or four or more guides 11 configured for securement of agitator elements 2 therein, as well as, optionally, channels configured for holding additional cosmetic composition 5 that is not necessarily within the mix volume (i.e., the volume surrounding and including agitator elements 2 and guides 11) or the applicator volume (i.e., the volume surrounding and including the applicator 4). In embodiments, at least first and second guides 11 comprise cylindrical or arcuate shapes, and first and second agitator elements 2 are spherical.

Figure 5:
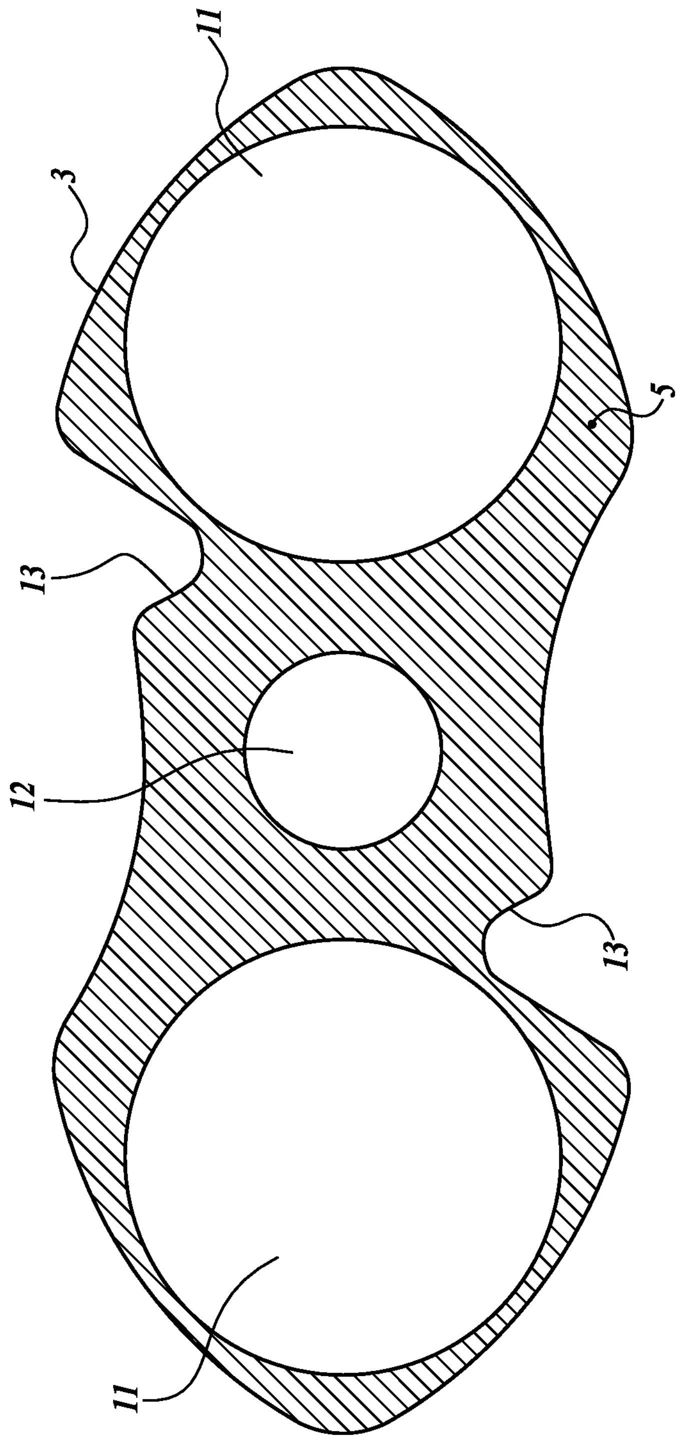
FIG. 5 shows a cross-sectional view of an example composition volume formed by two mix volumes and an applicator volume, and grooves, of an example container for mixture of a composition, according to aspects of the disclosure.
Figure 6:
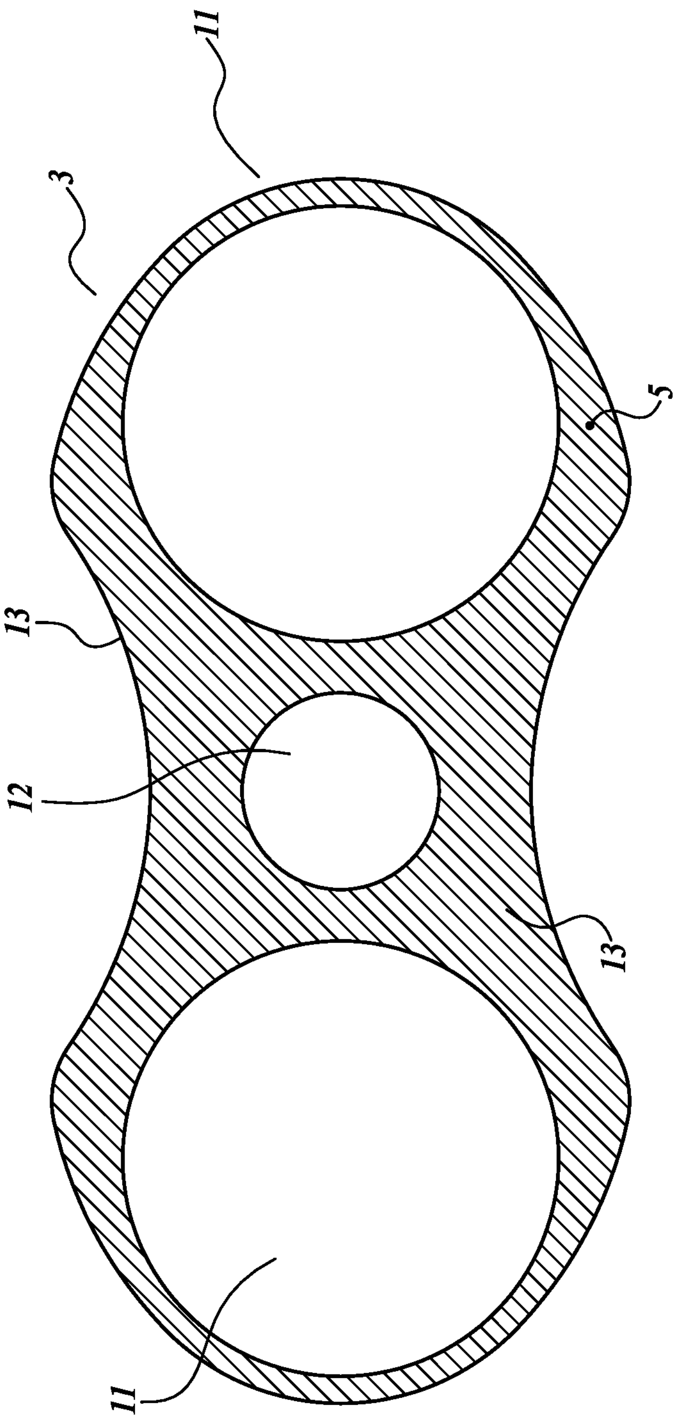
FIG. 6 shows a cross-sectional view of an example composition volume formed by two mix volumes and an applicator volume, and grooves, of an example container for mixture of a composition, according to aspects of the disclosure.

As shown by way of example at FIGS. 5 and 6, in embodiments, a cross-sectional shape of the container (e.g., a cross-sectional shape of the insert 3) defines a cross-sectional shape of the interior of the container and comprises one or more shape features, such as a curved line, a straight line, a right angle, an acute angle, a semi-circular line, a circular line, a rectangular line, a square line, or any combination thereof, for improved flow and mixing of the composition within the insert 3 during agitation and mixing. The applicator is insertable through an applicator volume 12, and mix volumes are defined at least in part by guides 11. The mix volumes are fluidly connected to the bulk volume of the composition 5, which is in turn fluidly connected to the applicator volume 12. In this manner, composition 5 is better able to be mixed and made more homogeneous, and the homogeneous composition better distributed through the interior of the container for use with the applicator.

Figure 7:
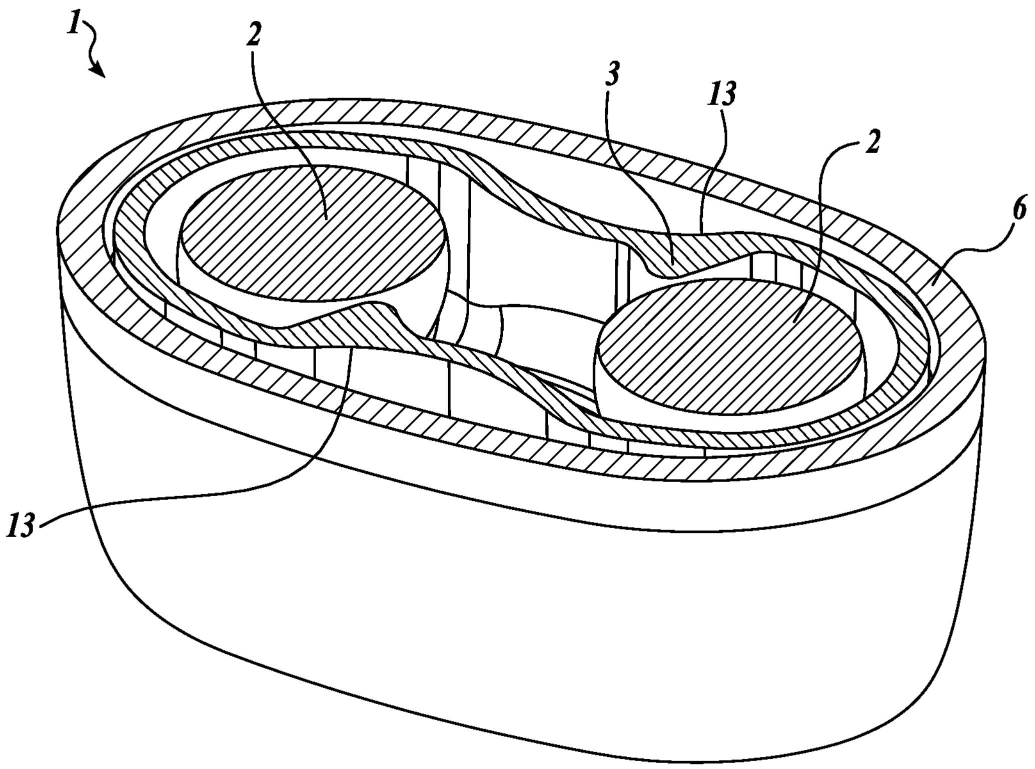
FIG. 7 shows a perspective cutaway view of an example container for mixture of a composition, according to aspects of the disclosure.
Figure 8:
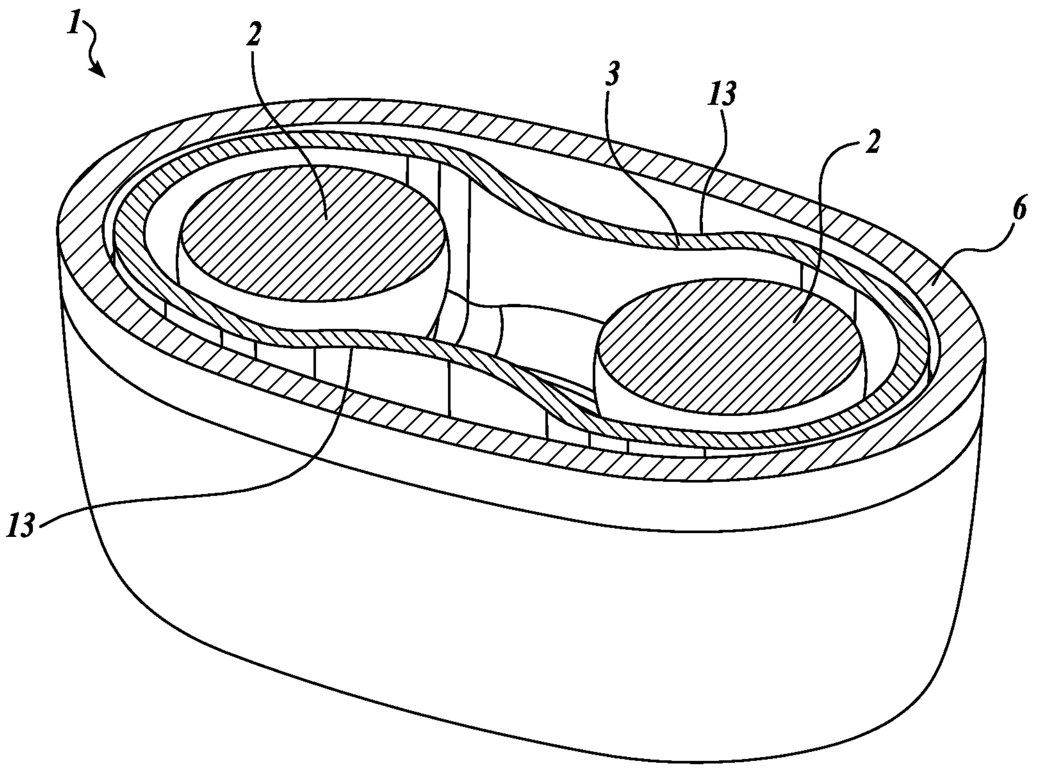
FIG. 8 shows a perspective cutaway view of an example container for mixture of a composition, according to aspects of the disclosure.
Figure 9:
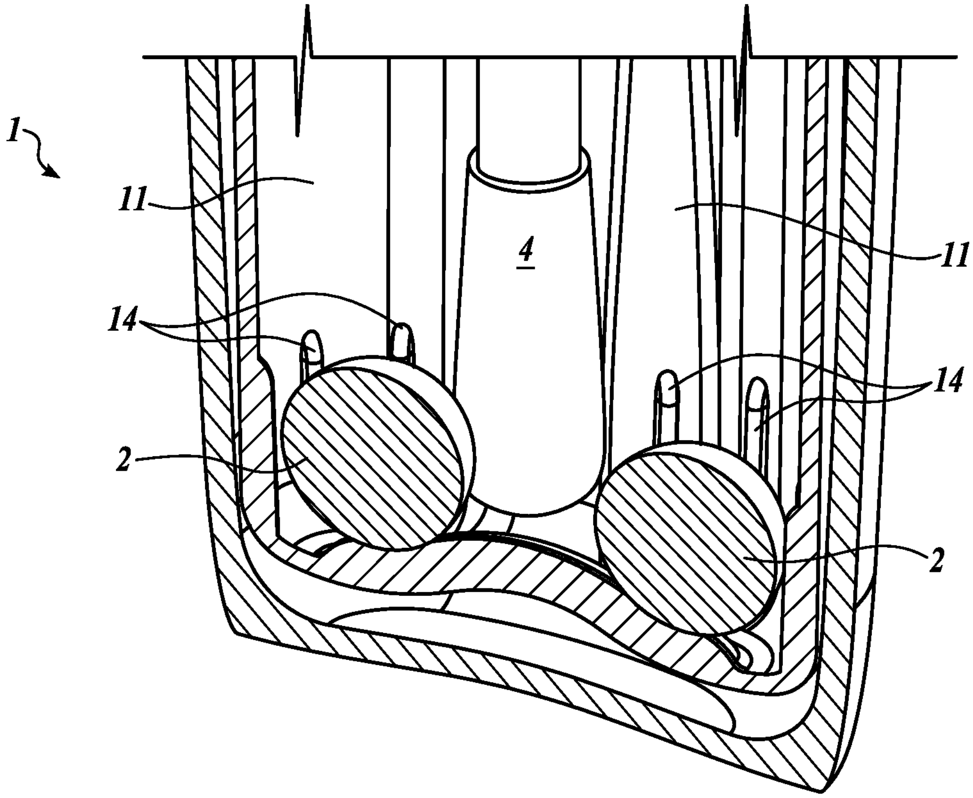
FIG. 9 shows a perspective cutaway view of an example container for mixture of a composition, showing a ridge, at a lower portion of the guide, that extends from an interior wall of the container into the mix volume to secure the agitator element therein, according to aspects of the disclosure.
Figure 10:
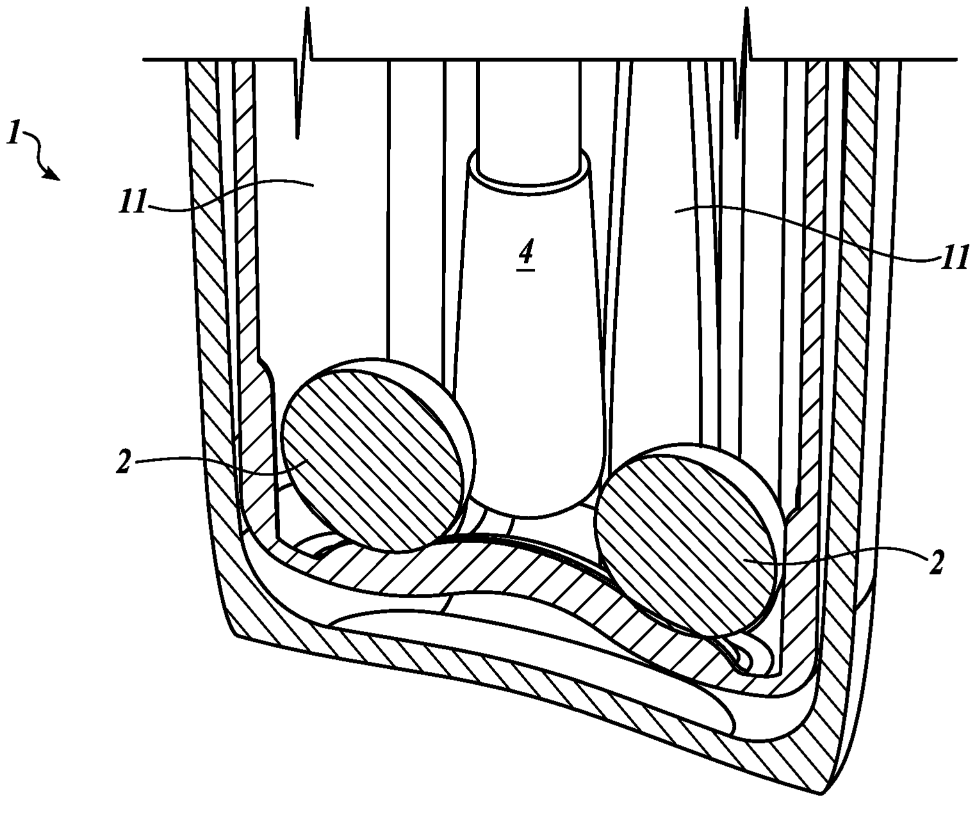
FIG. 10 shows a perspective cutaway view of an example container for mixture of a composition, without a ridge, according to aspects of the disclosure.
Figure 11:
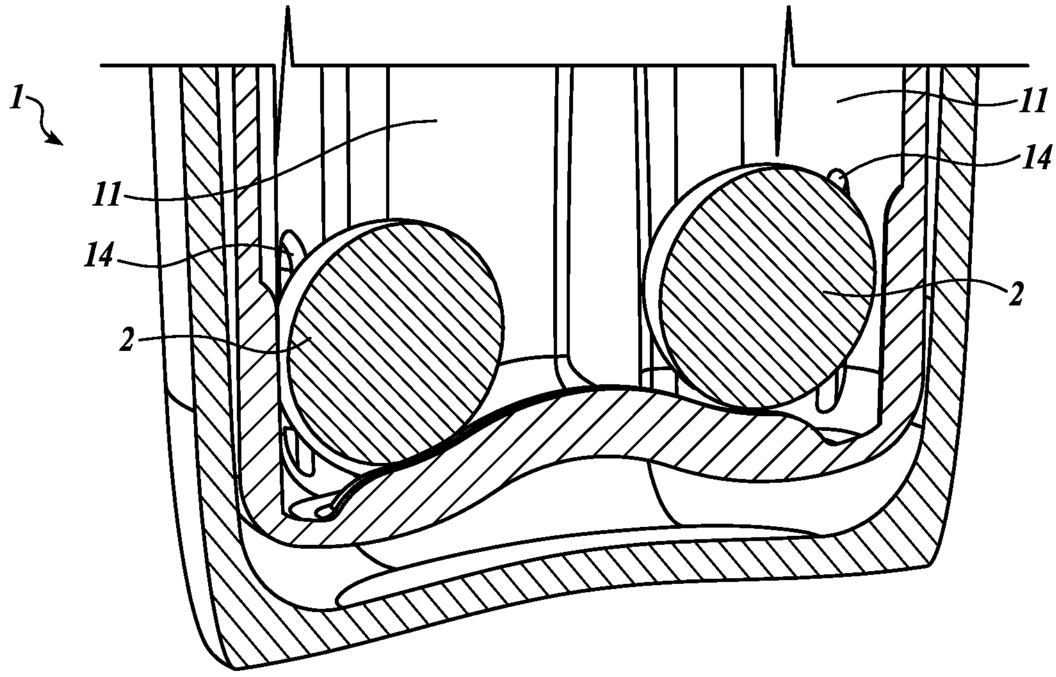
FIG. 11 shows a perspective cutaway view of an example container for mixture of a composition, showing a ridge, at a lower portion of the guide, that extends from an interior wall of the container into the mix volume to secure the agitator element therein, according to aspects of the disclosure.
Figure 12:
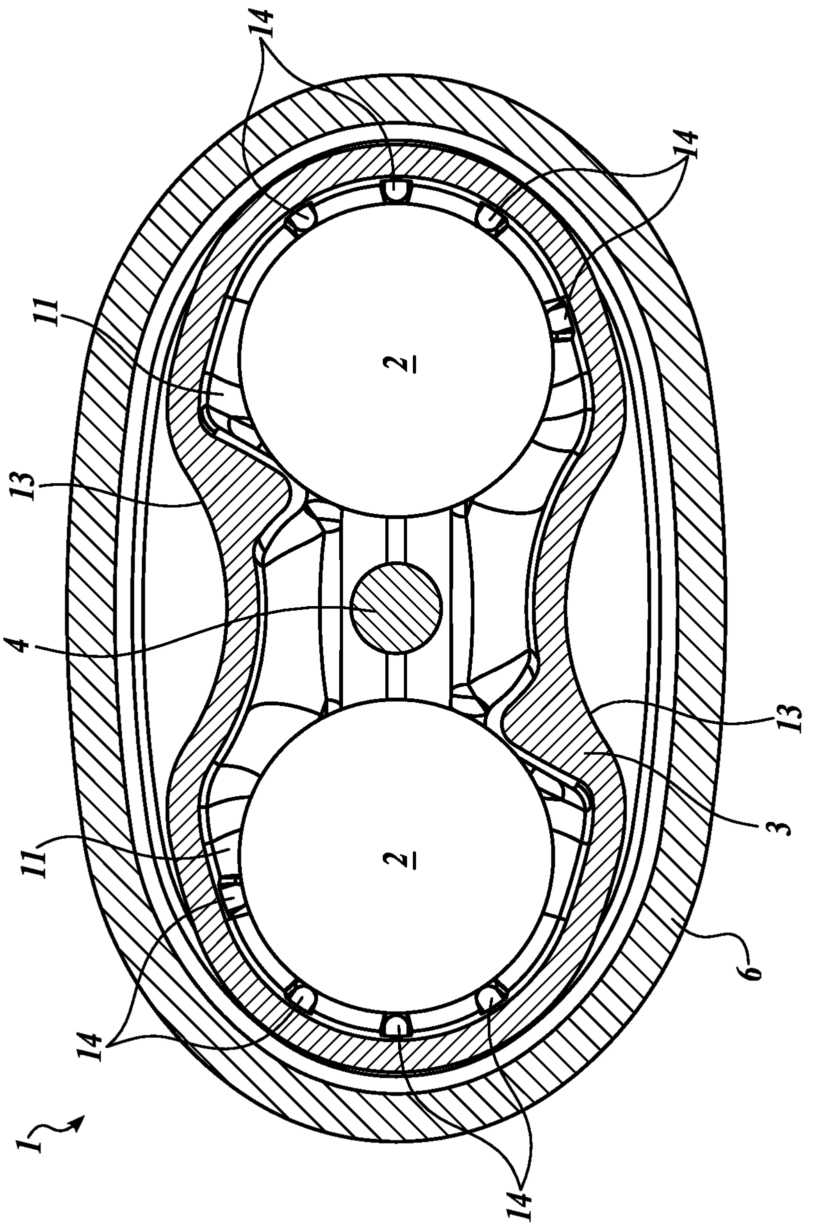
FIG. 12 shows a top cross-sectional view of an example container for mixture of a composition, according to aspects of the disclosure.
Figure 13:
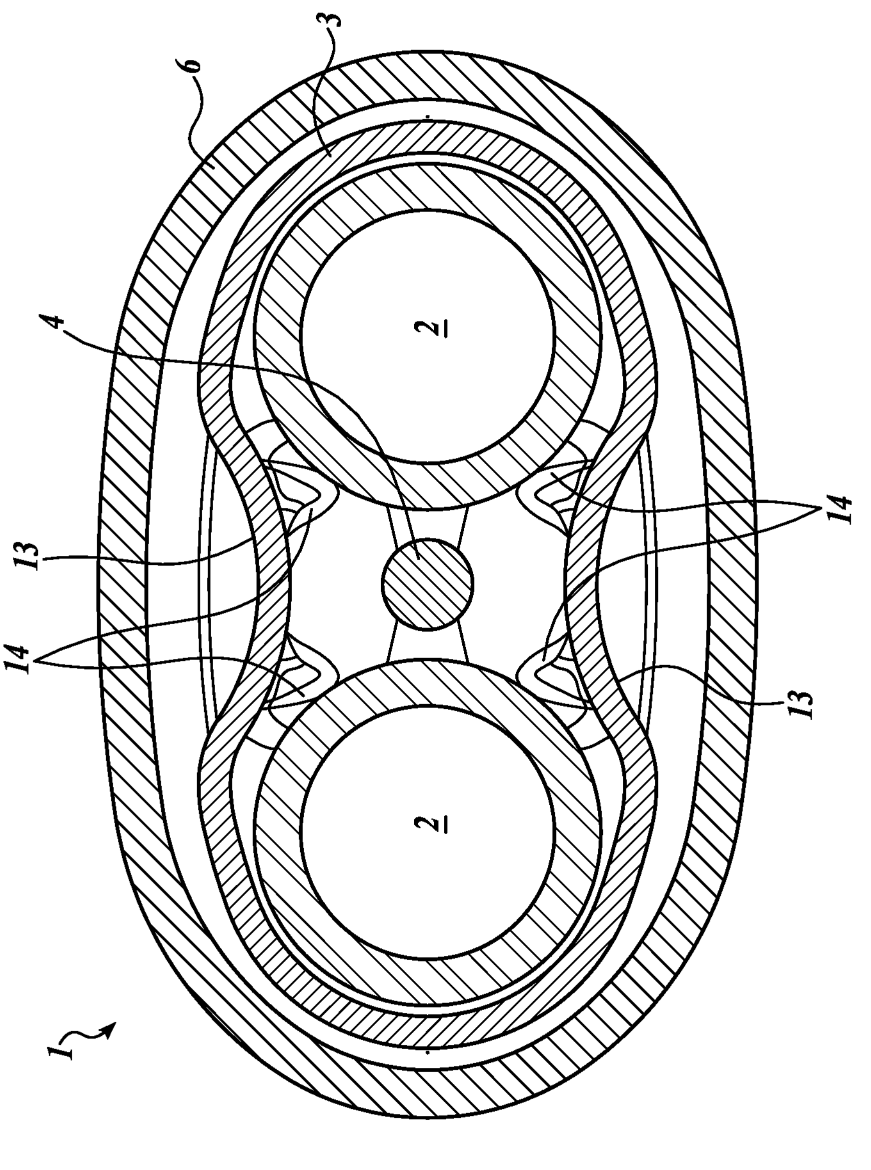
FIG. 13 shows a top cross-sectional view of an example container for mixture of a composition, according to aspects of the disclosure.
Figure 14:
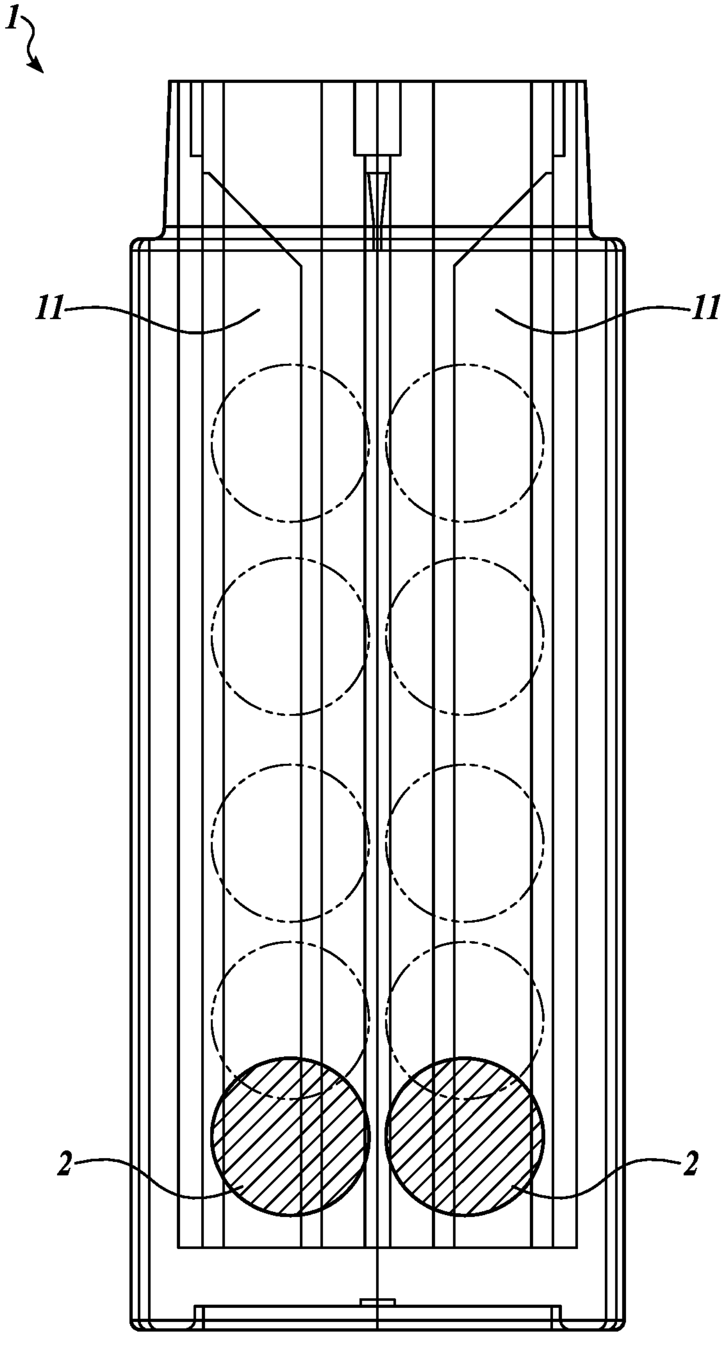
FIG. 14 shows a side view of an example container for mixture of a composition, during agitation and movement of agitator elements therein, according to aspects of the disclosure.
Figure 15:
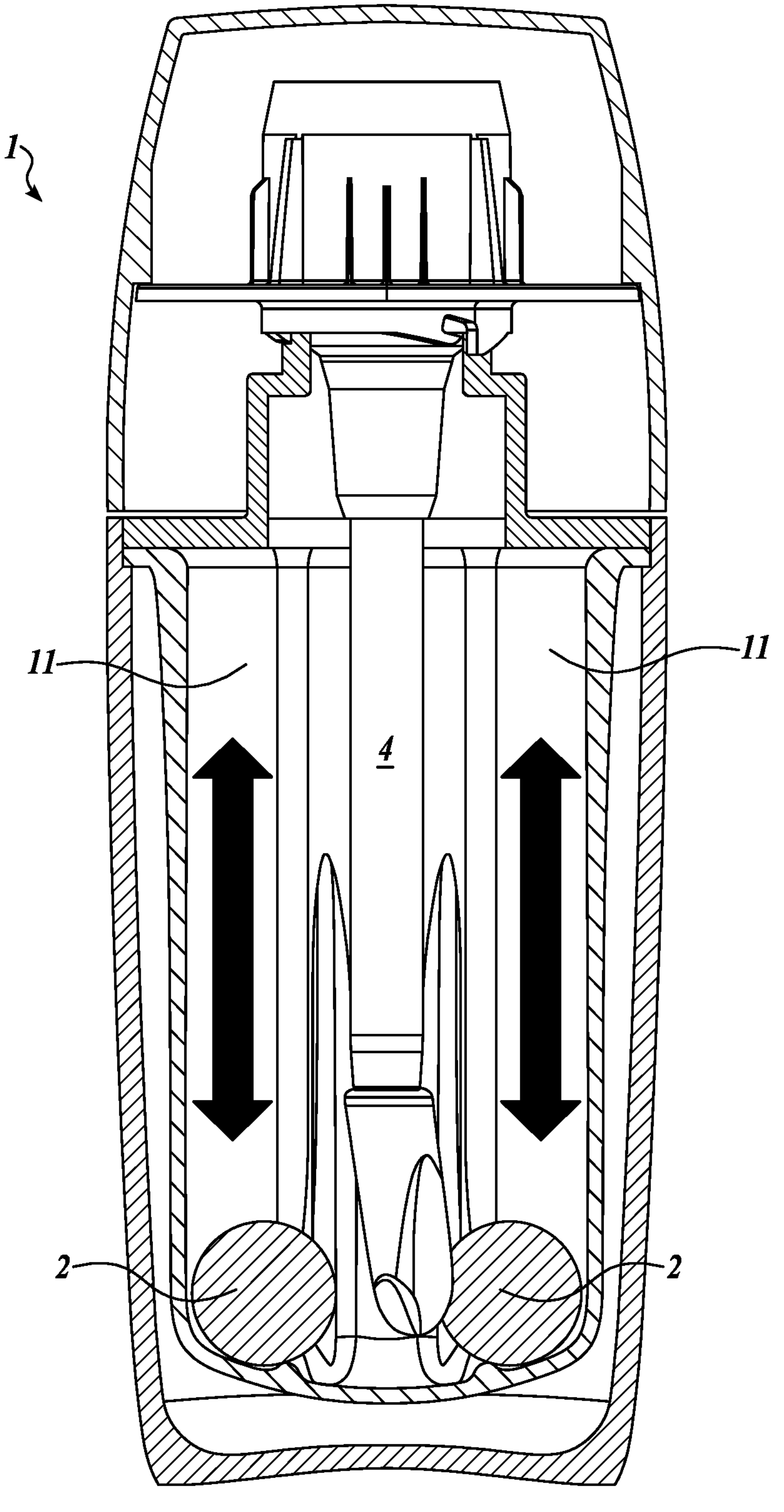
FIG. 15 shows a side view of an example container for mixture of a composition, before or after agitation and potential movement of agitator elements therein indicated by black double-headed arrows, according to aspects of the disclosure.
Figure 16:
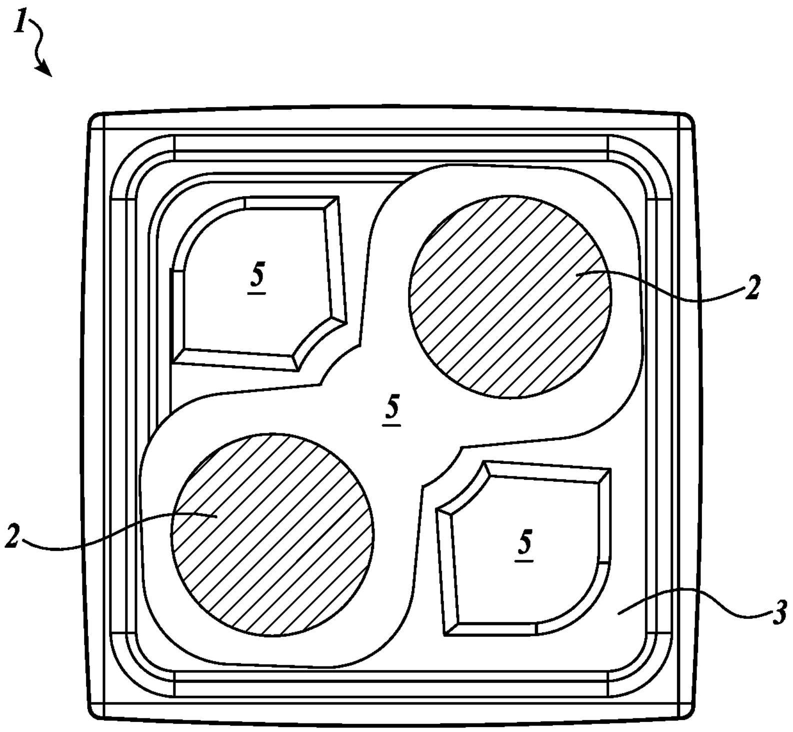
FIG. 16 shows a top cross-sectional view of a first example container for mixture of a composition, according to aspects of the disclosure.
Figure 17:
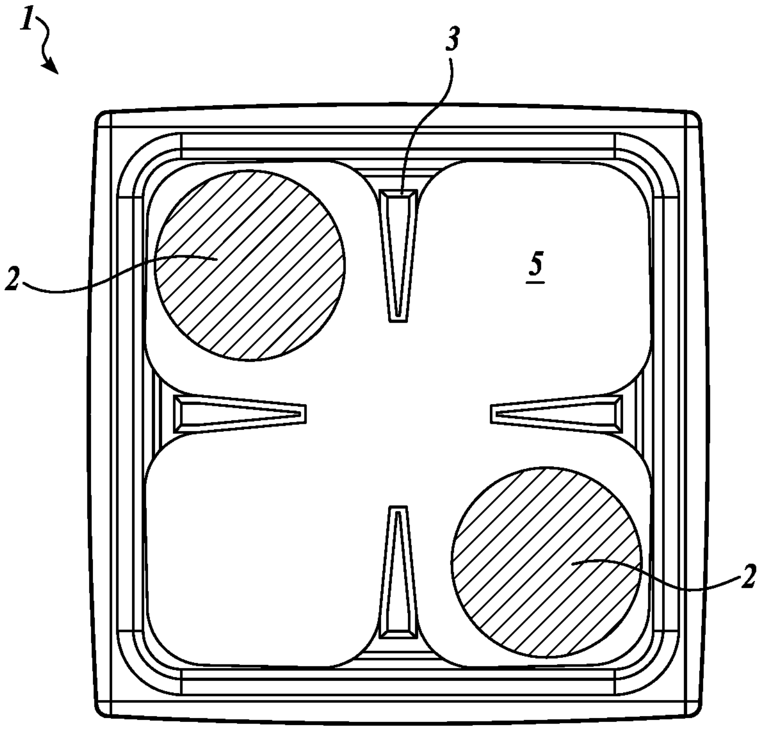
FIG. 17 shows a top cross-sectional view of a second example container for mixture of a composition, according to aspects of the disclosure.
Figure 18:
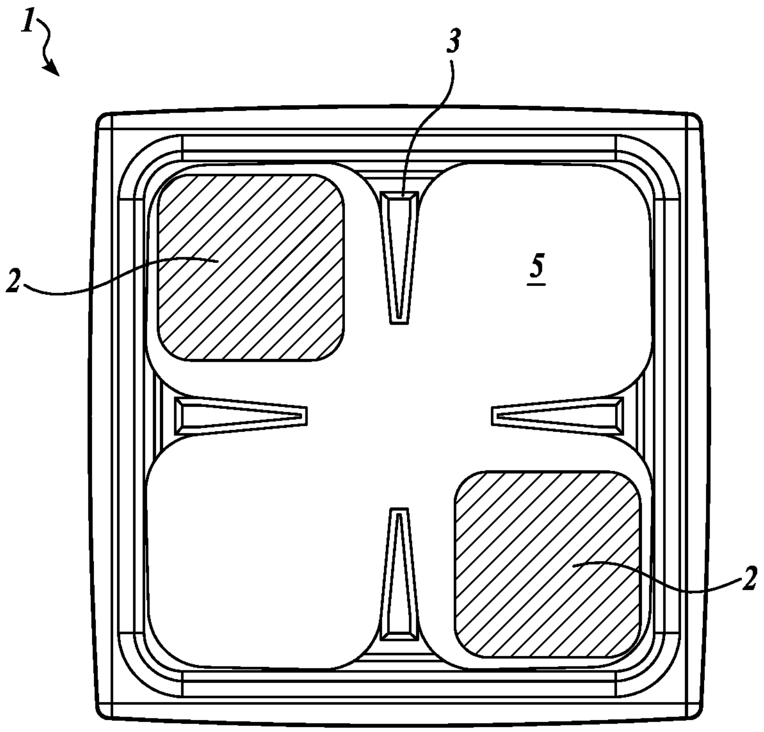
FIG. 18 shows a top cross-sectional view of a third example container for mixture of a composition, according to aspects of the disclosure.
Figure 19:
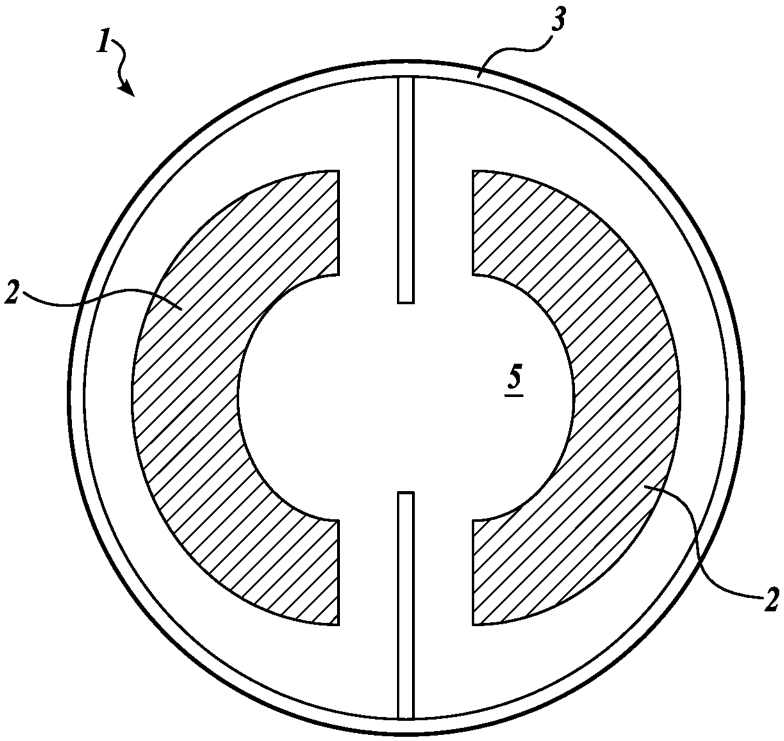
FIG. 19 shows a top cross-sectional view of a fourth example container for mixture of a composition, according to aspects of the disclosure.
Figure 20:
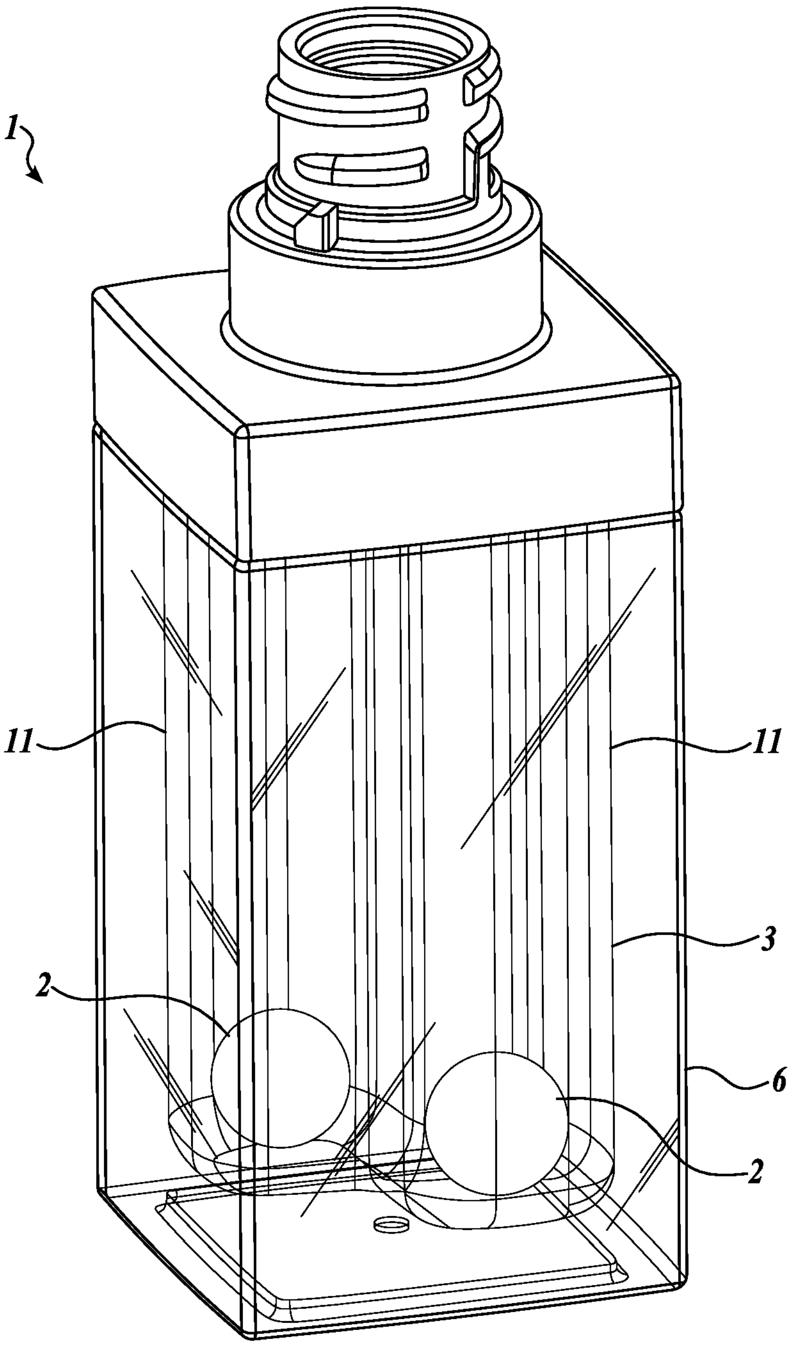
FIG. 20 shows a perspective view of an example container for mixture of a composition, showing shape of an insert as fitted within a shell of the container, according to aspects of the disclosure.
Figure 21:
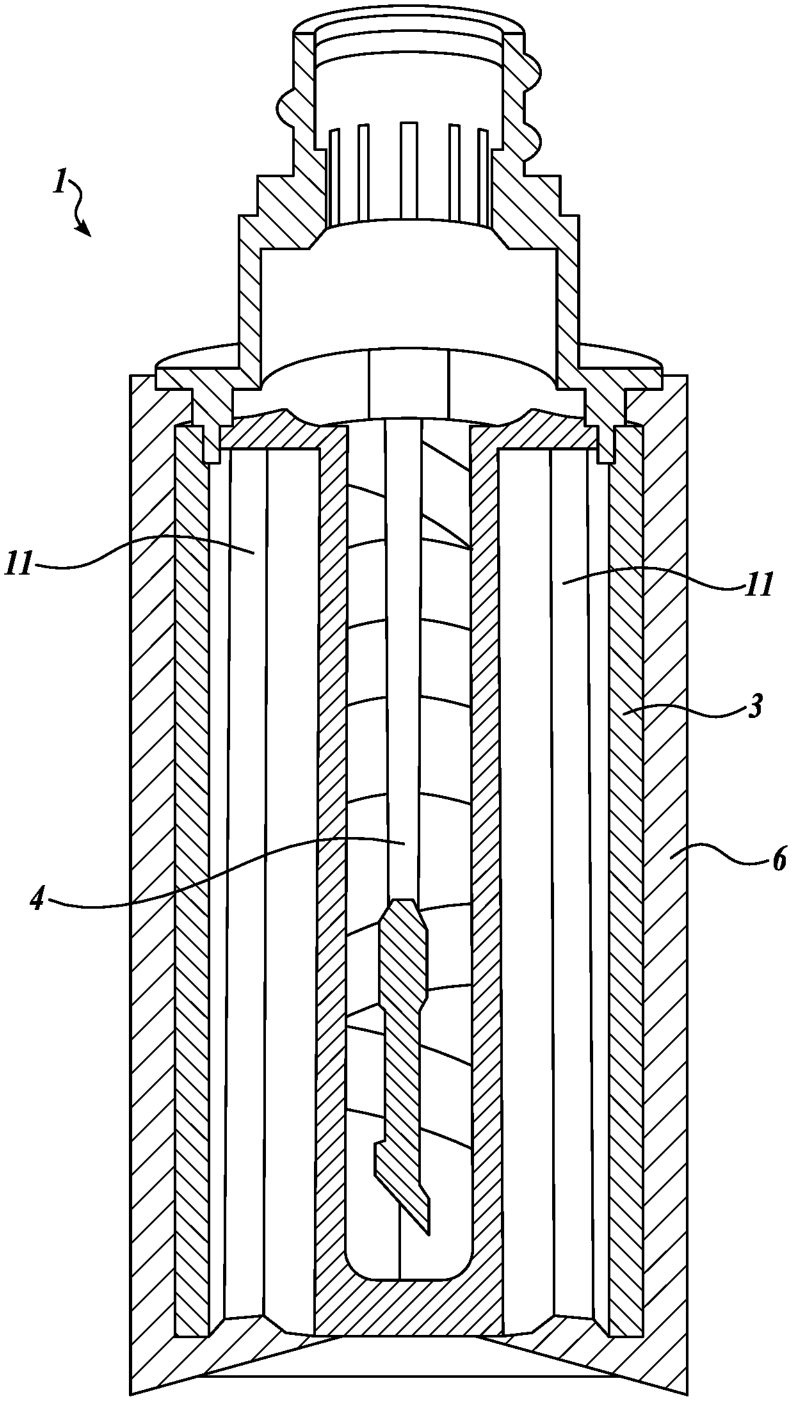
FIG. 21 shows a cross-sectional view of an example container for mixture of a composition, showing shape of an insert as fitted within a shell of the container, according to aspects of the disclosure.
Figure 22A:
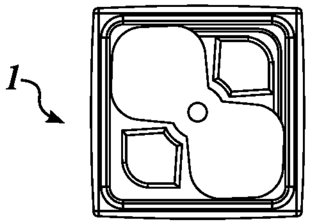
FIG. 22A shows a cross-sectional view of a fifth example container for mixture of a composition, having a particular shape or configuration, according to aspects of the disclosure.
Figure 22B:
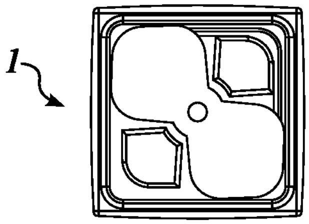
FIG. 22B shows a cross-sectional view of a sixth example container for mixture of a composition, having a particular shape or configuration, according to aspects of the disclosure.
Figure 22C:
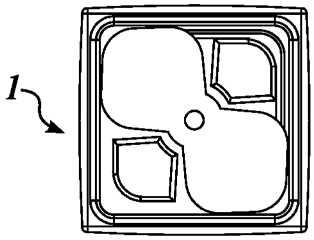
FIG. 22C shows a cross-sectional view of a seventh example container for mixture of a composition, having a particular shape or configuration, according to aspects of the disclosure.
Figure 22D:
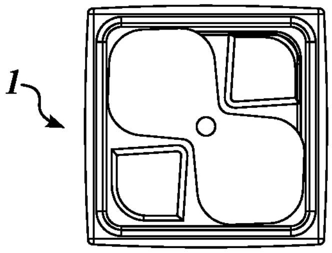
FIG. 22D shows a cross-sectional view of a eighth example container for mixture of a composition, having a particular shape or configuration, according to aspects of the disclosure.
Figure 22E:
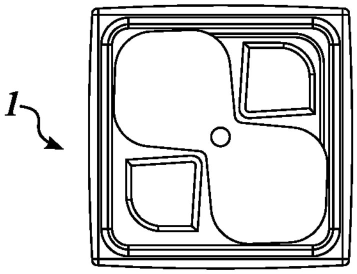
FIG. 22E shows a cross-sectional view of a ninth example container for mixture of a composition, having a particular shape or configuration, according to aspects of the disclosure.
Figure 22F:
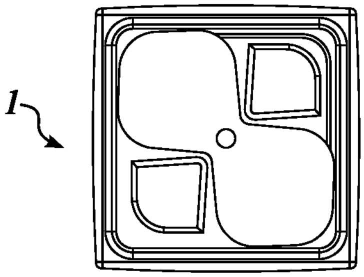
FIG. 22F shows a cross-sectional view of a tenth example container for mixture of a composition, having a particular shape or configuration, according to aspects of the disclosure.
Figure 23:
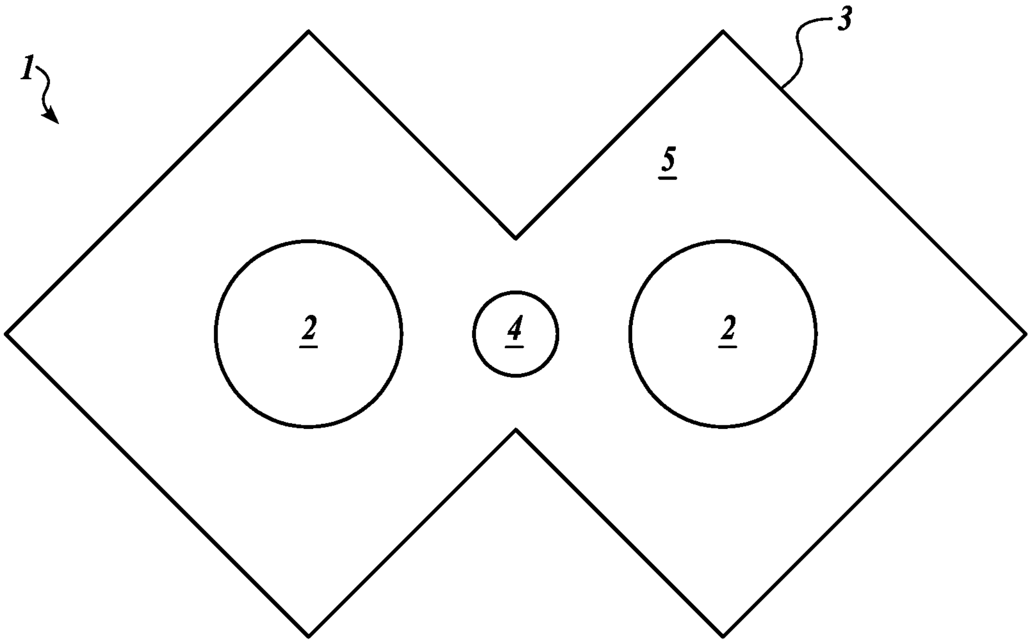
FIG. 23 shows a cross-sectional view of an eleventh example container for mixture of a composition, having a particular shape or configuration, according to aspects of the disclosure.
Figure 24:
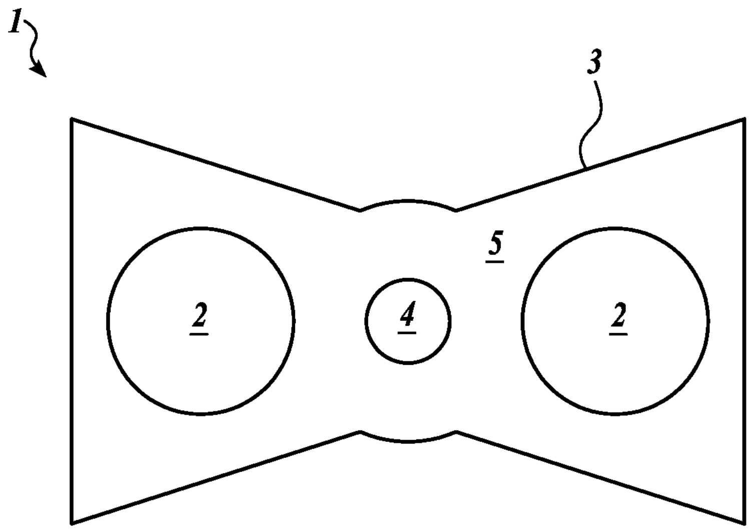
FIG. 24 shows a cross-sectional view of a twelfth example container for mixture of a composition, having a particular shape or configuration, according to aspects of the disclosure.
Figure 25:
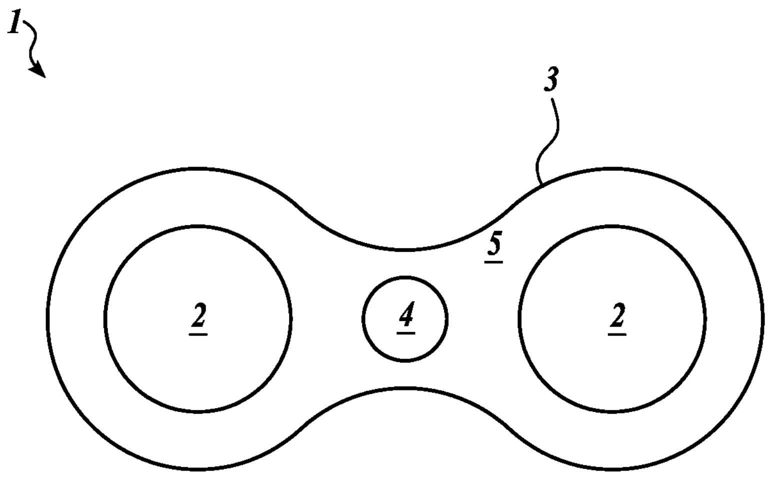
FIG. 25 shows a cross-sectional view of a thirteenth example container for mixture of a composition, having a particular shape or configuration, according to aspects of the disclosure.
Figure 26:
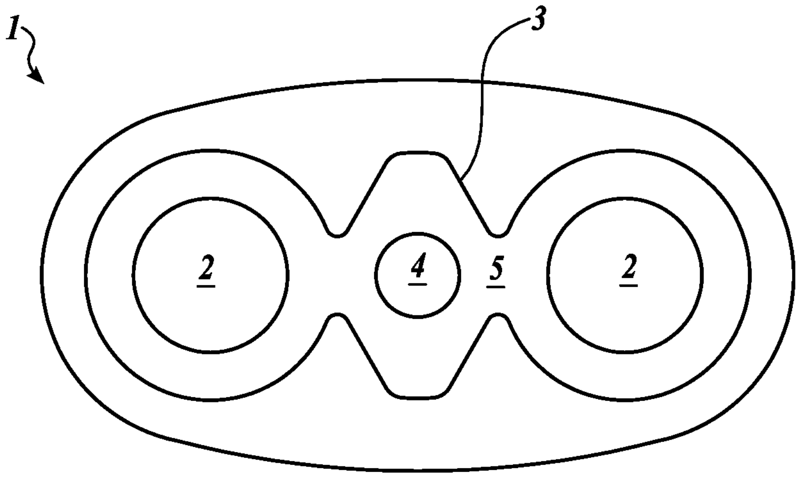
FIG. 26 shows a cross-sectional view of a fourteenth example container for mixture of a composition, having a particular shape or configuration, according to aspects of the disclosure.
Figure 27:
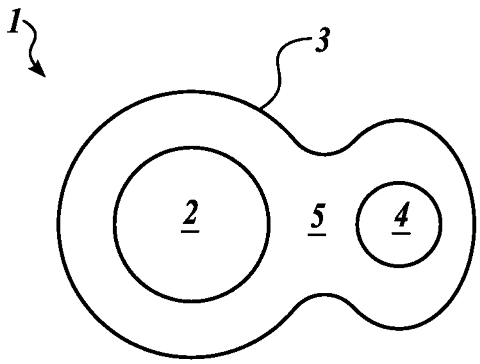
FIG. 27 shows a cross-sectional view of a fifteenth example container for mixture of a composition, having a particular shape or configuration, according to aspects of the disclosure.
Figure 28:
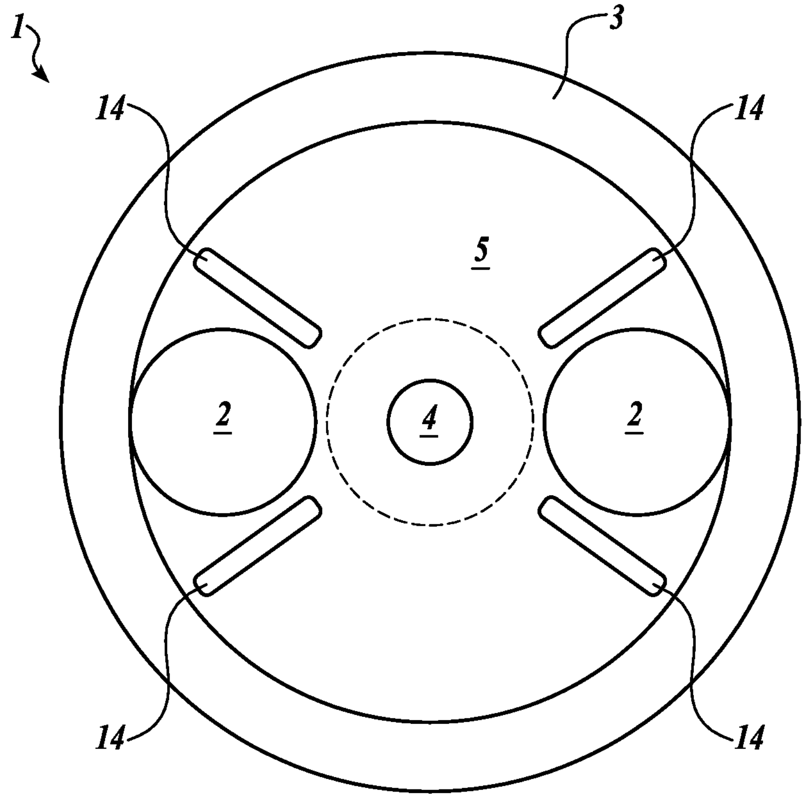
FIG. 28 shows a cross-sectional view of a sixteenth example container for mixture of a composition, having a particular shape or configuration, according to aspects of the disclosure.
Figure 29:
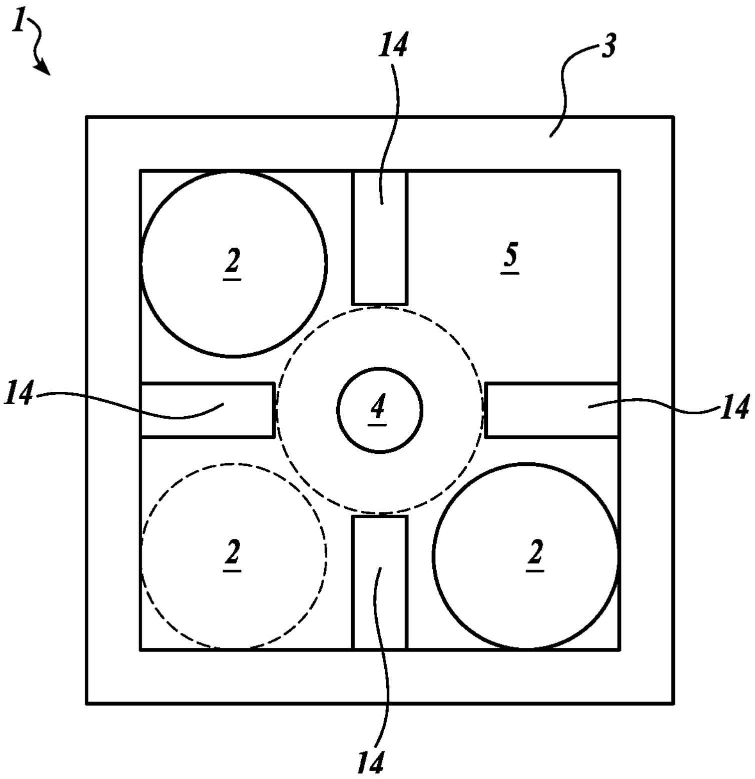
FIG. 29 shows a cross-sectional view of a seventeenth example container for mixture of a composition, having a particular shape or configuration, according to aspects of the disclosure.
Figure 30:
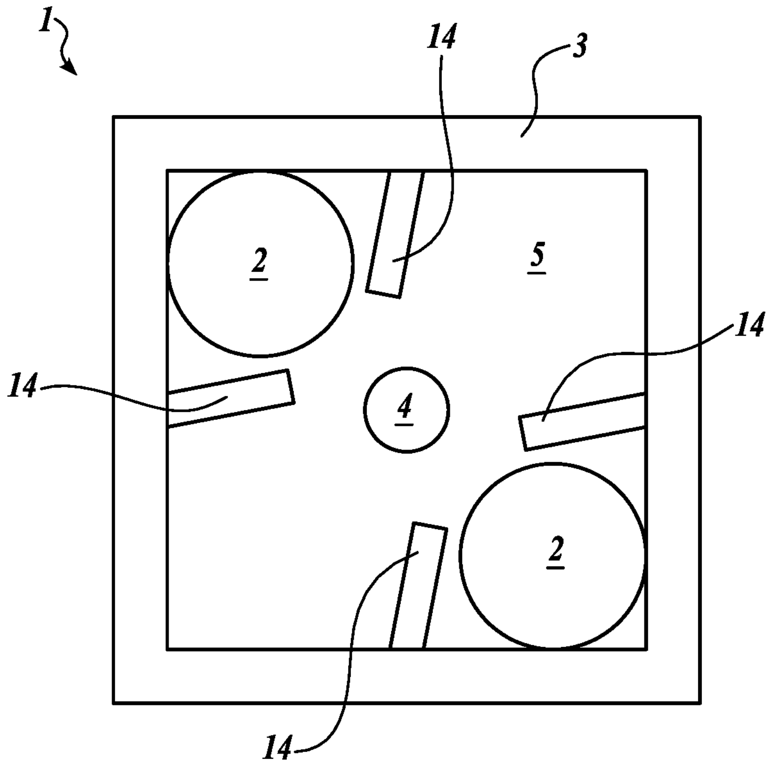
FIG. 30 shows a cross-sectional view of a eighteenth example container for mixture of a composition, having a particular shape or configuration, according to aspects of the disclosure.
Figure 31:
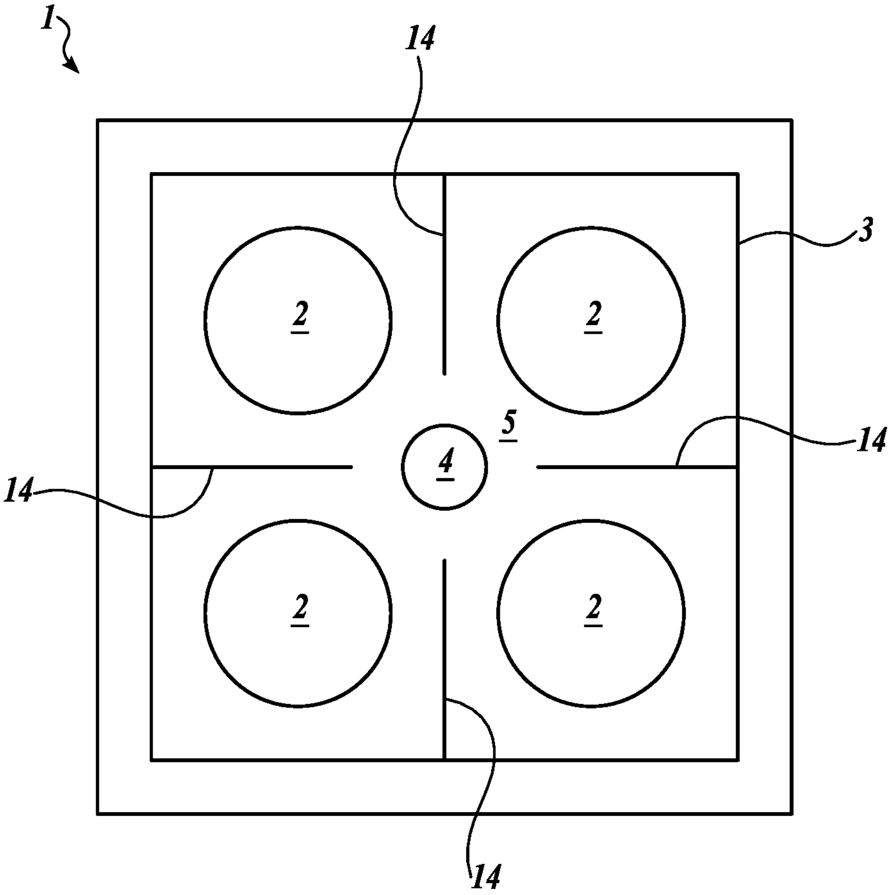
FIG. 31 shows a cross-sectional view of a nineteenth example container for mixture of a composition, having a particular shape or configuration, according to aspects of the disclosure.
Figure 32:
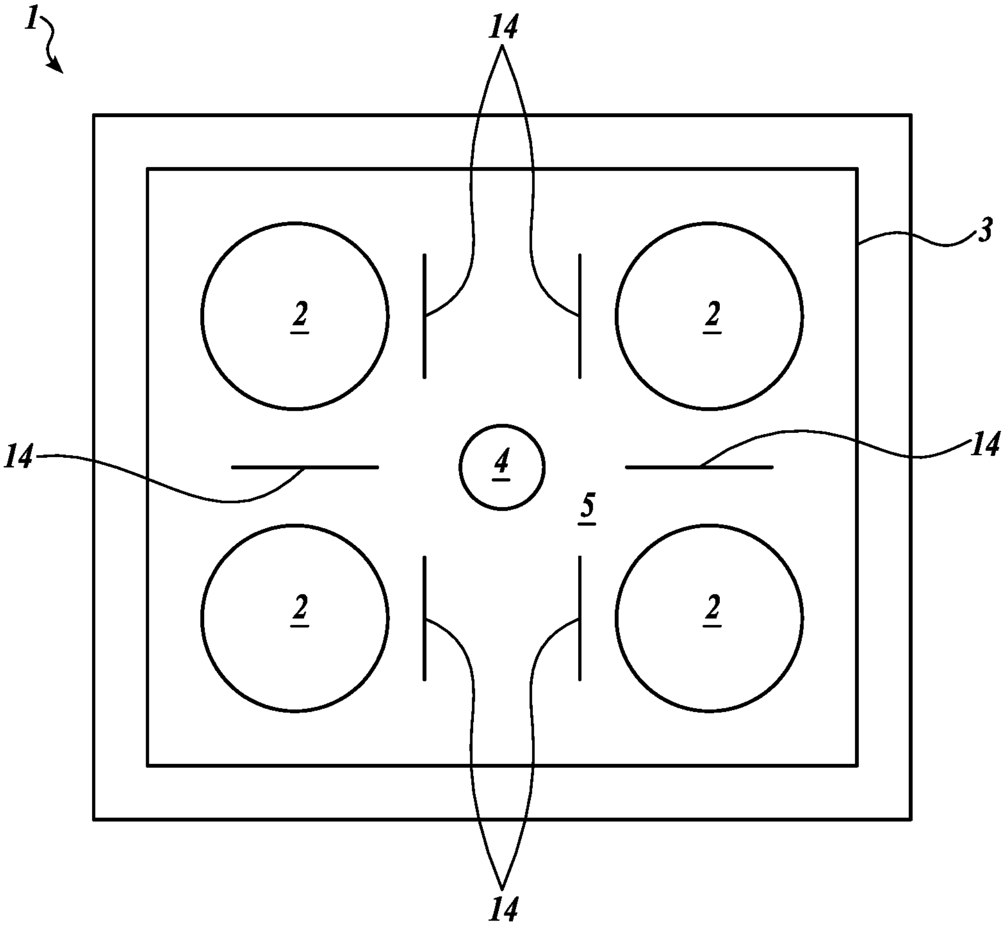
FIG. 32 shows a cross-sectional view of a twentieth example container for mixture of a composition, having a particular shape or configuration, according to aspects of the disclosure.

As shown by way of example at FIGS. 7-8, the agitator elements 2 are restricted in their horizontal movement within the guides, which can include one or more shape features for further definition of the guides of the insert 3. In embodiments, the container 1 comprises a groove 13 on an outer portion thereof that extends an interior wall of the container 1 (e.g., interior wall of insert 3) into a composition volume that excludes the mix volume and the applicator volume, such that the groove 13 increases mixture of the composition with agitation of the container 1. An example of such a groove 13 is also shown at FIGS. 5-8. In embodiments, the container comprises a first groove 13 and a second groove 13 disposed at opposite outer portions of the container 1, and the first groove 13 and the second groove 13 extend an interior wall of the container 1 (e.g., interior wall of insert 3) into the composition volume and increase mixture of the composition 5 with agitation of the container 1. In embodiments, the first groove 13 and the second groove 13 each comprises an arc shape (as shown by way of example at FIGS. 5-6), and this arc shape can further comprise an indentation shape (as shown by way of example at FIGS. 5 and 7 in contrast with FIGS. 6 and 8). The indentation shape further extends the interior wall of the container 1 (e.g., interior wall of insert 3) into the composition volume at positions adjacent to the mix volume, according to embodiments. Example indentation shapes, which contribute to the shape of the grooves 13 and therefore the guides for containing the agitator elements, are evident with comparison of FIGS. 5 and 7 to FIGS. 6 and 8, respectively.

In embodiments, with agitation of the container 1, the agitator elements 2 do not enter the applicator volume (i.e., the central volume space within insert 3 of FIG. 7). In this manner, with agitation of the container 1, the applicator, when disposed within the applicator volume, is not contacted by the agitator elements 2.

In the shown example embodiments of FIGS. 1A-1B, 2-21, 22A-22F, 23-26, and 28-33, a container can comprise a first agitator element 2 and a second agitator element 2 that are movably disposed within a first guide 11 and a second guide 11 of the interior of the container 1, respectively, and the first and second guides 11 define first and second mix volumes and are elongated such that the first and second agitator elements 2 are movable through the first and second mix volumes, respectively. Since the applicator volume is in fluid communication with the first and second mix volumes, as agitation of the container 1 moves the first and second agitator elements 2 through the first and second mix volumes, respectively, the first and second agitator elements 2 do not enter the applicator volume. In this manner the applicator 4, when disposed within the applicator volume, is not contacted by either of the first and second agitator elements 2. In other embodiments, and as shown by way of example at FIG. 27, with respect to an amount of agitator elements needed for a particular implementation, a container 1 can comprise, consist essentially of, or consist of one agitator element 2 that is configured for mixture of cosmetic composition 5 and use by applicator 4 within insert 3 of the container 1. In this manner, while much of the disclosure includes two or more agitator elements 2, in at least some embodiments, one agitator element 2 can be implemented, for example, for a minimalistic design or a certain use case.

As shown by way of examples in FIGS. 1A-1B, 2-21, 22A-22F, and 23-33, the agitator elements 2 can assume any suitable form, but in example embodiments, are spheres. As such, in embodiments, the first agitator element 2 and the second agitator element 2 is each, individually: spherical, cuboidal, or semi-circular. While spherical agitator elements 2 can provide reduced drag and better mixing in at least some implementations, other shapes can provide other advantages, depending on the implementation.

Figure 33:
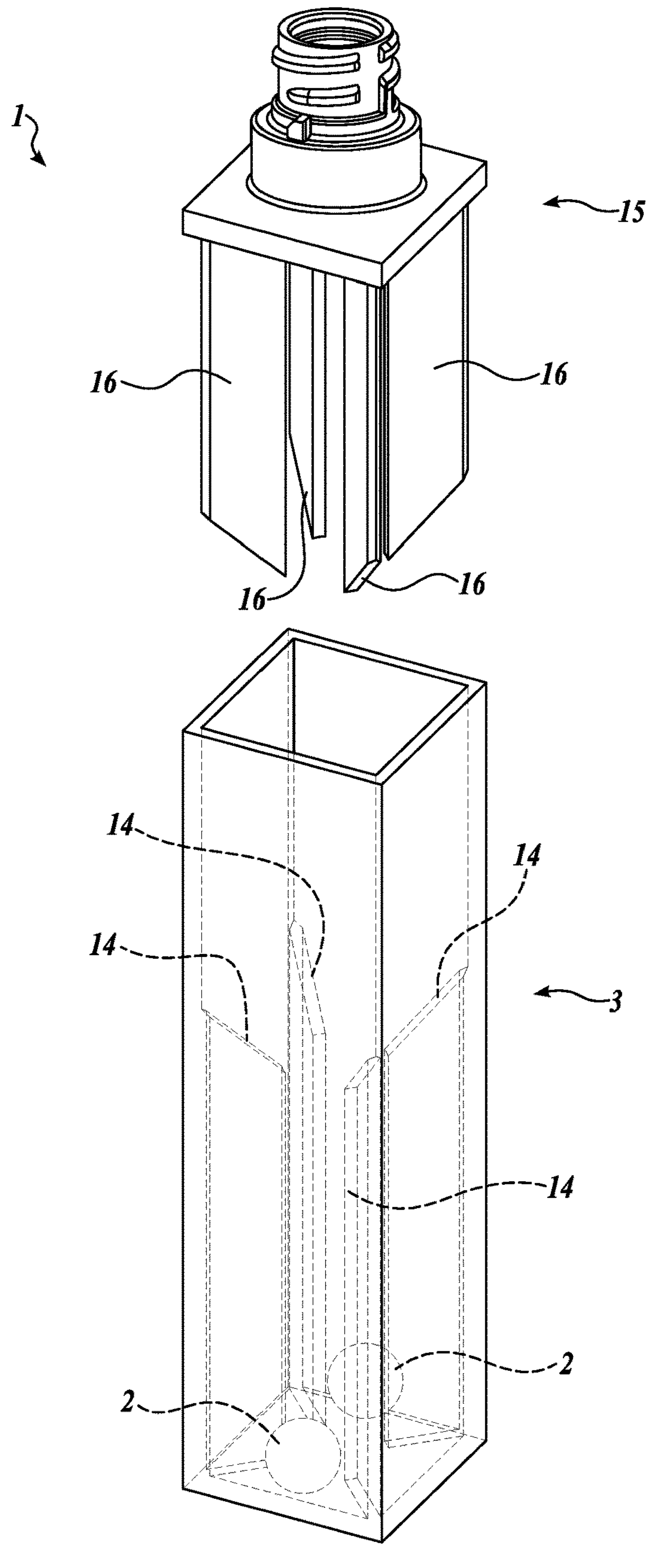
FIG. 33 shows a perspective view of an example container for mixture of a composition, with a cap insert removed therefrom, according to aspects of the disclosure.

FIG. 33 shows another example container 1 for mixture of a cosmetic composition, the container 1 including two agitator elements 2, extended ridges 14 that define guides for containment and guidance of the agitator elements 2 as well as mix volumes (e.g., empty guides), and an insert lid 15 that includes ridge extenders 16 that extend therefrom. As the insert lid 15 is affixed to the upper opening of the insert 3, ridge extenders 16 contact (or become proximal to) extended ridges 14, thereby creating a column for containment of the agitator elements 2. Since the extended ridges 14 do not extend all the way into the middle of the insert 13, there is space for fluid communication between the mix volumes and the applicator volume for effective mixing.

NON-LIMITING EMBODIMENTS

While general features of the disclosure are described and shown and particular features of the disclosure are set forth in the claims, the following non-limiting embodiments relate to features, and combinations of features, that are explicitly envisioned as being part of the disclosure. The following non-limiting Embodiments contain elements that are modular and can be combined with each other in any number, order, or combination to form a new non-limiting Embodiment, which can itself be further combined with other non-limiting Embodiments.

Embodiment 1. A container for mixture of a composition, the container comprising: an agitator element movably disposed within a guide of an interior of the container, wherein the guide defines a mix volume and is elongated such that the agitator element is movable through the mix volume; and an applicator disposable within an applicator volume of the interior of the container, wherein the applicator volume is in fluid communication with the mix volume; wherein agitation of the container moves the agitator element through the mix volume.

Embodiment 2. The container of any other Embodiment, wherein the guide further comprises a ridge, at a lower portion of the guide, that extends from an interior wall of the container into the mix volume configured to contact the agitator element for securement of the agitator element in place when the container is not agitated.

Embodiment 3. The container of any other Embodiment, wherein the applicator is flocked and is susceptible to breakage.

Embodiment 4. The container of any other Embodiment, wherein the agitator element is a ball bearing selected from the group consisting of: a stainless steel ball bearing, a 300 series type stainless steel ball bearing, a type 302 stainless steel ball bearing, a type 304 stainless steel ball bearing, a type 316 stainless steel ball bearing, and any combination thereof.

Embodiment 5. The container of any other Embodiment, wherein the guide is disposed within an insert of the container, wherein the insert is insertable into a shell of the container, wherein the shell of the container is sealable with a cap of the container by securement of the cap to the shell.

Embodiment 6. The container of any other Embodiment, wherein a cross-sectional shape of the container that defines a cross-sectional shape of the interior of the container comprises a curved line, a straight line, a right angle, an acute angle, a semi-circular line, a circular line, a rectangular line, a square line, or any combination thereof.

Embodiment 7. The container of any other Embodiment, wherein with agitation of the container, the agitator element does not enter the applicator volume.

Embodiment 8. The container of any other Embodiment, wherein with agitation of the container, the applicator, when disposed within the applicator volume, is not contacted by the agitator element.

Embodiment 9. The container of any other Embodiment, comprising a first agitator element and a second agitator element movably disposed within a first guide and a second guide of the interior of the container, respectively, wherein the first and second guides define first and second mix volumes and are elongated such that the first and second agitator elements are movable through the first and second mix volumes, respectively, wherein the applicator volume is in fluid communication with the first and second mix volumes, and wherein agitation of the container moves the first and second agitator elements through the first and second mix volumes, respectively.

Embodiment 10. The container of any other Embodiment, wherein with agitation of the container, the first and second agitator elements do not enter the applicator volume.

Embodiment 11. The container of any other Embodiment, wherein with agitation of the container, the applicator, when disposed within the applicator volume, is not contacted by either of the first and second agitator elements.

Embodiment 12. The container of any other Embodiment, wherein the first agitator element and the second agitator element is each, individually: spherical, cuboidal, or semi-circular.

Embodiment 13. The container of any other Embodiment, wherein the container comprises a groove on an outer portion thereof that extends an interior wall of the container into a composition volume that excludes the mix volume and the applicator volume, wherein the groove increases mixture of the composition with agitation of the container.

Embodiment 14. The container of any other Embodiment, wherein the container comprises a first groove and a second groove disposed at opposite outer portions of the container, wherein the first groove and the second groove extend an interior wall of the container into the composition volume and increase mixture of the composition with agitation of the container.

Embodiment 15. The container of any other Embodiment, wherein the first groove and the second groove each comprises an arc shape.

Embodiment 16. The container of any other Embodiment, wherein the arc shape of the first groove and the second groove further comprises an indentation shape that further extends the interior wall of the container into the composition volume at positions adjacent to the mix volume.

Embodiment 17. A container for mixture of a composition, the container comprising: a first agitator element and a second agitator element movably disposed within a first guide and a second guide of an interior of the container, respectively; wherein the first and second guides define first and second mix volumes and are elongated such that the first and second agitator elements are movable through the first and second mix volumes, respectively, wherein an applicator volume of the interior of the container is configured to receive an applicator therein and is in fluid communication with the first and second mix volumes, wherein the first and second mix volumes combined with the applicator volume form a composition volume for the composition; and wherein agitation of the container moves the first and second agitator elements through the first and second mix volumes, respectively.

Embodiment 18. The container of any other Embodiment, wherein the first and second guides comprise cylindrical or arcuate shapes, and wherein the first and second agitator elements are spherical.

Embodiment 19. The container of any other Embodiment, wherein the container comprises a first groove and a second groove disposed at opposite outer portions of the container, wherein the first groove and the second groove extend an interior wall of the container into the composition volume and increase mixture of the composition with agitation of the container.

Embodiment 20. The container of any other Embodiment, wherein the first groove and the second groove each comprises an arc shape, wherein the arc shape optionally further comprises an indentation shape that further extends the interior wall of the container into the composition volume at positions adjacent to the mix volume.

While illustrative embodiments have been illustrated and described, it will be appreciated that various changes can be made therein without departing from the spirit and scope of the invention.

The embodiments of the invention in which an exclusive property or privilege is claimed are defined as follows:

1. A container for mixture of a composition, the container comprising:

an agitator element movably disposed within a guide of an interior of the container, wherein the guide defines a mix volume and is elongated such that the agitator element is movable through the mix volume; and an applicator disposable within an applicator volume of the interior of the container, wherein the applicator volume is adjacent to, parallel along major axes with, and in fluid communication with the mix volume;

wherein agitation of the container moves the agitator element through the mix volume.

2. The container of claim 1, wherein the guide further comprises a ridge, at a lower portion of the guide, that extends from an interior wall of the container into the mix volume configured to contact the agitator element for securement of the agitator element in place when the container is not agitated.

3. The container of claim 1, wherein the applicator is flocked and is susceptible to breakage.

4. The container of claim 1, wherein the agitator element is a ball bearing selected from the group consisting of: a stainless steel ball bearing, a 300 series type stainless steel ball bearing, a type 302 stainless steel ball bearing, a type 304 stainless steel ball bearing, a type 316 stainless steel ball bearing, and any combination thereof.

5. The container of claim 1, wherein the guide is disposed within an insert of the container, wherein the insert is insertable into a shell of the container, wherein the shell of the container is sealable with a cap of the container by securement of the cap to the shell.

6. The container of claim 1, wherein a cross-sectional shape of the container that defines a cross-sectional shape of the interior of the container comprises a curved line, a straight line, a right angle, an acute angle, a semi-circular line, a circular line, a rectangular line, a square line, or any combination thereof.

7. The container of claim 1, wherein with agitation of the container, the agitator element does not enter the applicator volume.

8. The container of claim 7, wherein with agitation of the container, the applicator, when disposed within the applicator volume, is not contacted by the agitator element.

9. The container of claim 1, comprising a first agitator element and a second agitator element movably disposed within a first guide and a second guide of the interior of the container, respectively, wherein the first and second guides define first and second mix volumes and are elongated such that the first and second agitator elements are movable through the first and second mix volumes, respectively, wherein the applicator volume is adjacent to, parallel along major axes with, and in fluid communication with the first and second mix volumes, and wherein agitation of the container moves the first and second agitator elements through the first and second mix volumes, respectively.

10. The container of claim 9, wherein with agitation of the container, the first and second agitator elements do not enter the applicator volume.

11. The container of claim 10, wherein with agitation of the container, the applicator, when disposed within the applicator volume, is not contacted by either of the first and second agitator elements.

12. The container of claim 9, wherein the first agitator element and the second agitator element is each, individually: spherical, cuboidal, or semi-circular.

13. The container of claim 1, wherein the container comprises a groove on an outer portion thereof that extends an interior wall of the container into a composition volume that excludes the mix volume and the applicator volume, wherein the groove increases mixture of the composition with agitation of the container.

14. The container of claim 13, wherein the container comprises a first groove and a second groove disposed at opposite outer portions of the container, wherein the first groove and the second groove extend an interior wall of the container into the composition volume and increase mixture of the composition with agitation of the container.

15. The container of claim 14, wherein the first groove and the second groove each comprises an arc shape.

16. The container of claim 15, wherein the arc shape of the first groove and the second groove further comprises an indentation shape that further extends the interior wall of the container into the composition volume at positions adjacent to the mix volume.

17. A container for mixture of a composition, the container comprising:

a first agitator element and a second agitator element movably disposed within a first guide and a second guide of an interior of the container, respectively;

wherein the first and second guides define first and second mix volumes and are elongated such that the first and second agitator elements are movable through the first and second mix volumes, respectively, wherein an applicator volume of the interior of the container is configured to receive an applicator therein and is adjacent to, parallel along major axes with, and in fluid communication with the first and second mix volumes, wherein the first and second mix volumes combined with the applicator volume form a composition volume for the composition; and wherein agitation of the container moves the first and second agitator elements through the first and second mix volumes, respectively.

18. The container of claim 17, wherein the first and second guides comprise cylindrical or arcuate shapes, and wherein the first and second agitator elements are spherical.

19. The container of claim 17, wherein the container comprises a first groove and a second groove disposed at opposite outer portions of the container, wherein the first groove and the second groove extend an interior wall of the container into the composition volume and increase mixture of the composition with agitation of the container.

20. The container of claim 19, wherein the first groove and the second groove each comprises an arc shape, wherein the arc shape optionally further comprises an indentation shape that further extends the interior wall of the container into the composition volume at positions adjacent to the mix volume.

* * * * *